US011690091B2

United States Patent
Zhang et al.

(10) Patent No.: US 11,690,091 B2
(45) Date of Patent: Jun. 27, 2023

(54) RESOURCE MAPPING METHOD AND APPARATUS, AND RESOURCE MAPPING INDICATION METHOD AND APPARATUS

(71) Applicant: HUAWEI TECHNOLOGIES CO., LTD., Guangdong (CN)

(72) Inventors: Huazi Zhang, Hangzhou (CN); Ming Jia, Ottawa (CA); Rong Li, Hangzhou (CN); Jian Wang, Hangzhou (CN); Xianbin Wang, Hangzhou (CN); Shengchen Dai, Hangzhou (CN); Jun Wang, Hangzhou (CN); Yiqun Ge, Ottawa (CA); Yan Chen, Shanghai (CN); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 96 days.

(21) Appl. No.: 17/215,243

(22) Filed: Mar. 29, 2021

(65) Prior Publication Data
US 2021/0227553 A1    Jul. 22, 2021

Related U.S. Application Data

(63) Continuation of application No. PCT/CN2019/108723, filed on Sep. 27, 2019.

(30) Foreign Application Priority Data

Sep. 30, 2018   (CN) .......................... 201811161422.1

(51) Int. Cl.
*H04W 72/00*      (2023.01)
*H04W 72/541*     (2023.01)
(Continued)

(52) U.S. Cl.
CPC .......... *H04W 72/541* (2023.01); *H04L 1/001* (2013.01); *H04L 1/0004* (2013.01); *H04L 5/0037* (2013.01); *H04W 72/121* (2013.01)

(58) Field of Classification Search
None
See application file for complete search history.

(56) References Cited

U.S. PATENT DOCUMENTS 10,637,705 B1 *   4/2020   Shattil ................. H04L 27/2636
10,680,687 B2 *   6/2020   Lee ....................... H04L 5/0055
(Continued)

FOREIGN PATENT DOCUMENTS

CN        102869097 A      1/2013
CN        105281878 A      1/2016
(Continued)

OTHER PUBLICATIONS

Extended European Search Report issued in EP19864664.8, dated Oct. 29, 2021, 10 pages.
(Continued)

*Primary Examiner* — Gerald A Smarth

(57) ABSTRACT

A resource mapping method and apparatus and a resource mapping indication method and apparatus are provided to adapt to an interference cancellation function of a receiver. According to the method, a network device obtains a mapping mode used for resource mapping during uplink transmission, and sends, to a terminal, information indicating the mapping mode. The mapping mode is used to indicate mapping locations of a plurality of modulation symbols in a resource mapping block (RMB), the RMB comprises a plurality of resource elements (REs), and at least one of the plurality of REs carries at least two modulation symbols.

20 Claims, 12 Drawing Sheets

(51) Int. Cl.
*H04L 1/00* (2006.01)
*H04L 5/00* (2006.01)
*H04W 72/121* (2023.01)

(56) References Cited

U.S. PATENT DOCUMENTS

2011/0194551 A1* 8/2011 Lee .................. H04L 5/0048
 375/267
2016/0352400 A1 12/2016 Chae
2016/0373224 A1* 12/2016 Kim .................. H04L 27/261

FOREIGN PATENT DOCUMENTS

| CN | 105812106 A | 7/2016 | | |
|---|---|---|---|---|
| CN | 108271175 A | 7/2018 | | |
| WO | WO-2010072963 A1 | * | 7/2010 | ......... H03H 17/0266 |
| WO | 2017177880 A1 | 10/2017 | | |
| WO | 2017198197 A1 | 11/2017 | | |
| WO | 2018112293 A1 | 6/2018 | | |
| WO | 2018149390 A1 | 8/2018 | | |

OTHER PUBLICATIONS

Examination Report issued in IN Application No. 202117016837, dated Feb. 8, 2022, 5 pages.
Huawei, HiSilicon, PAPR reduction for multi-tone PUSCH transmissions. 3GPP TSG RAN WG1 Meeting #84 , St Julian's, Malta, Feb. 15-19, 2016, R1-160755, 9 pages.
Vivo, Discussion on NOMA transmitters, 3GPP TSG RAN WG1 Meeting #94, Gothenburg, Sweden, Aug. 20-24, 2018, R1-1808230, 6 pages.
Office Action issued in CN 201811161422.1 dated Aug. 19, 2020, 8 pages.
Notice of Allowance issued in CN 201811161422.1 dated Mar. 16, 2021, 4 pages.
Search Report and Written Opinion issued in PCT/CN2019/108723 dated Dec. 27, 2019, 8 pages.

* cited by examiner

RESOURCE MAPPING METHOD AND APPARATUS, AND RESOURCE MAPPING INDICATION METHOD AND APPARATUS

CROSS-REFERENCE TO RELATED APPLICATIONS

This application is a continuation of International Application No. PCT/CN2019/108723, filed on Sep. 27, 2019, which claims priority to Chinese Patent Application No. 201811161422.1, filed on Sep. 30, 2018. The disclosures of the aforementioned applications are hereby incorporated by reference in their entireties.

TECHNICAL FIELD

Embodiments of this application relate to the field of communications technologies, and in particular, to a resource mapping method and apparatus, and a resource mapping indication method and apparatus.

BACKGROUND

In wireless communication, one network device may communicate with a plurality of terminals, and the plurality of terminals may transmit signals by using a same radio resource. This is referred to as superposition transmission. Such a superposition transmission mode may increase system capacity to some extent, and in particular, can effectively increase the system capacity during uplink transmission. However, this transmission mode causes a signal collision between terminals, and impairs transmission performance of a single terminal.

In the existing technology, as shown in FIG. 1, losses caused by a signal collision are reduced by using a receiver with a multi-user detection (MUD) algorithm and an interference cancellation (IC) algorithm. To eliminate interference, the receiver uses the IC algorithm to input a decoding result of a channel decoder to a signal reconstructor for signal reconstruction, and uses an interference canceller to subtract a reconstructed signal from an original signal to obtain an interference-cancelled signal. Then, the receiver sends the interference-cancelled signal back to a multi-user detector. Although the MUD algorithm and the IC algorithm bring extra complexity, a total system capacity can be increased if the interference is eliminated.

Experiments show that a quantity of terminals involved in the collision and manners of the signal collision between the terminals have great impact on the MUD algorithm, the channel decoding algorithm, and the IC algorithm, and consequently greatly affects system capacity and user bit error rate performance. A collision manner may depend on a manner of mapping to-be-sent symbols of a terminal to a transmission resource. An existing resource mapping manner is not ideally applied to the MUD algorithm, the channel decoding algorithm, and the IC algorithm. Therefore, the resource mapping manner needs to be improved.

SUMMARY

Embodiments of the present disclosure provide a resource mapping method and apparatus, and a resource mapping indication method and apparatus, to better adapt to an interference cancellation function of a receiver, and further improve system capacity and user bit error rate performance.

Specific technical solutions provided in the embodiments of the present disclosure are described as follows:

According to a first non-limiting aspect of an example embodiment, a resource mapping indication method is provided. The method may be performed by a network device, and the method is implemented by using the following steps: A network device obtains a mapping mode used for resource mapping during uplink transmission. The network device sends, to a terminal, information indicating the mapping mode. The mapping mode is used to indicate mapping locations of a plurality of modulation symbols in a resource mapping block (RMB), the RMB includes a plurality of resource elements (REs), and at least one of the plurality of REs carries at least two modulation symbols. In this way, a plurality of terminals use the fixed mapping mode on each RMB of a segment of resources, and the plurality of modulation symbols sent during the uplink transmission can evenly collide in the RMB, thereby helping reduce complexity of a receiver, and improving application effects of a resource mapping method in an MUD algorithm, a channel decoding algorithm, and an IC algorithm. When a system load is relatively heavy, there is a relatively large performance gain, and the fixed resource mapping mode is easy to describe and implement.

In an example embodiment, the mapping mode includes a mapping matrix, the mapping matrix is used to indicate mapping locations of a plurality of modulation symbols of a plurality of terminals in one resource mapping block (RMB), columns in the mapping matrix are in a one-to-one correspondence with the resource elements (REs) in the RMB, and a quantity of rows in the mapping matrix indicates a maximum quantity of modulation symbols carried on any one of the plurality of REs.

In an example embodiment, the network device obtains a plurality of sequentially arranged modulation symbols; the network device determines a quantity of the columns in the mapping matrix based on a quantity of resource elements (REs) included in one RMB; and the network device determines locations of the plurality of modulation symbols in the mapping matrix.

In an example embodiment, a first interval between locations, in the mapping matrix, of any two adjacent modulation symbols in the plurality of sequentially arranged modulation symbols is fixed.

In an example embodiment, the first interval is obtained through row-by-row traversal, or the first interval is obtained through column-by-column traversal.

In an example embodiment, the first interval and a quantity of rows in the mapping matrix are relatively prime, and the first interval and a quantity of columns in the mapping matrix are relatively prime. In this way, repeated mapping of modulation symbols to one ME can be prevented.

In an example embodiment, the plurality of modulation symbols include a plurality of groups of modulation symbols, an $i^{th}$ group of modulation symbols in the plurality of groups of modulation symbols occupy an $i^{th}$ row in the mapping matrix, and i is a natural number; and a second interval between locations, in the $i^{th}$ row, of any two adjacent modulation symbols in the $i^{th}$ group of modulation symbols is fixed.

In an example embodiment, the second interval and the quantity of rows in the mapping matrix are relatively prime, and the second interval and the quantity of columns in the mapping matrix are relatively prime. In this way, repeated mapping of modulation symbols to one ME can be prevented.

In an example embodiment, the network device determines locations of different groups of modulation symbols in the mapping matrix based on different second intervals.

In an example embodiment, the plurality of modulation symbols include a plurality of groups of modulation symbols; and the network device maps an $i^{th}$ group of modulation symbols in the plurality of groups of modulation symbols to an row in the mapping matrix based on a cyclic shift value.

In an example embodiment, cyclic shift values based on which any two groups of modulation symbols are mapped to the mapping matrix are different.

In an example embodiment, the plurality of modulation symbols include two groups of modulation symbols; and the network device maps an $i^{th}$ group of modulation symbols in the two groups of modulation symbols to an $i^{th}$ row in the mapping matrix by using an interleaver, where one group of modulation symbols in the two groups of modulation symbols are interleaved in a row-in-row-out manner, and the other group of modulation symbols in the two groups of modulation symbols are interleaved in a row-in-column-out manner.

In an example embodiment, a quantity of rows of the interleaver is a quantity of users in one group of modulated symbols.

In an example embodiment, that the network device obtains a plurality of sequentially arranged modulation symbols may be implemented in the following manner: The network device arranges a plurality of users based on user sequence numbers. The network device spreads modulation symbols of each of the plurality of users, to obtain the plurality of modulation symbols.

In an example embodiment, that the network device obtains a plurality of sequentially arranged modulation symbols may be implemented in the following manner: The network device groups a plurality of users. The network device spreads modulation symbols of users in each group obtained through the grouping, to obtain the plurality of groups of modulation symbols.

In an example embodiment, that the network device groups a plurality of users may be further implemented in the following manner: the network device groups the plurality of users based on one or more of a mapping ratio, a power domain, a code domain, or a spatial domain, where the mapping ratio is determined by a quantity of REs included in one RMB and a quantity of modulation symbols that are of one user and that can be carried on the RMB.

In an example embodiment, the mapping matrix is a basic mapping matrix, and the basic mapping matrix includes:

$$\begin{bmatrix} 1 & 1 & 2 & 2 & 3 & 3 & 4 & 4 & 5 & 5 & 6 & 6 \\ 7 & 9 & 11 & 8 & 12 & 7 & 10 & 11 & 9 & 12 & 8 & 10 \end{bmatrix};$$

$$\begin{bmatrix} 1 & 1 & 1 & 2 & 2 & 2 & 3 & 3 & 3 & 4 & 4 & 4 \\ 5 & 6 & 7 & 6 & 7 & 8 & 8 & 5 & 6 & 7 & 8 & 5 \end{bmatrix};$$

$$\begin{bmatrix} 1 & 1 & 1 & 1 & 2 & 2 & 2 & 2 & 3 & 3 & 3 & 3 \\ 4 & 5 & 6 & 4 & 6 & 4 & 5 & 6 & 5 & 6 & 4 & 5 \end{bmatrix}; \begin{bmatrix} 1 & 1 & 1 & 2 & 2 & 2 & 2 & 3 & 3 & 3 & 3 \\ 4 & 5 & 6 & 4 & 4 & 5 & 6 & 5 & 4 & 5 & 6 & 6 \\ 7 & 8 & 9 & 7 & 8 & 7 & 8 & 9 & 9 & 9 & 7 & 8 \end{bmatrix};$$

or $\begin{bmatrix} 1 & 1 & 1 & 1 & 1 & 1 & 2 & 2 & 2 & 2 & 2 & 2 \\ 3 & 3 & 3 & 4 & 4 & 4 & 3 & 3 & 3 & 4 & 4 & 4 \\ 5 & 5 & 6 & 6 & 5 & 5 & 6 & 6 & 5 & 5 & 6 & 6 \\ 7 & 8 & 7 & 8 & 7 & 8 & 7 & 8 & 7 & 8 & 7 & 8 \end{bmatrix}.$ In an example embodiment, the mapping matrix is a transformed mapping matrix, and the transformed mapping matrix is obtained after the basic mapping matrix is transformed by using any one or a combination of the following: based on that a quantity of scheduled terminals is less than a quantity of terminals carried in the basic mapping matrix, mapping locations of some terminals in the basic mapping matrix are set to null; based on that a quantity of modulation symbols actually mapped by a terminal is less than a quantity of modulation symbols that are of one user and that are carried in the basic mapping matrix, mapping locations of some modulation symbols in the basic mapping matrix are set to null; based on that a quantity of modulation symbols actually mapped by a terminal is greater than a quantity of modulation symbols that are of one user and that are carried in the basic mapping matrix, modulation symbols of one terminal are placed in mapping locations occupied by a plurality of terminals in the basic mapping matrix; or some mapping locations in any quantity of basic mapping matrices are combined.

In an example embodiment, that the mapping mode used for the resource mapping during the uplink transmission is obtained may be further implemented in the following manner: The network device maps the plurality of modulation symbols into a circular buffer at a third interval. The network device determines the mapping locations of the plurality of modulation symbols in the RMB based on locations of the plurality of modulation symbols in the circular buffer.

In an example embodiment, a location m, in the circular buffer, of an $N^{th}$ modulation symbol in the plurality of modulation symbols is mod(Sequence$_p$(N), MRS), and a mapping location r of the $N^{th}$ modulation symbol in the RMB is floor(m/ceil(OF)), where mod represents a modulo operation, floor represents rounding down, the sequence Sequence$_p$=[c, c+p, c+2*p, . . . , c+PRS*p], c is a constant, MRS is a quantity of all mapping elements (MEs) in a mapping block (MB), the MB is an operation unit of the mapping mode, one modulation symbol may be mapped to one ME, PRS represents a maximum quantity of modulation symbols carried on the RMB, p is the third interval, Sequence$_p$(N) is a value, in the sequence, corresponding to the $N^{th}$ symbol in the plurality of modulation symbols, Sequence$_p$(N)=c+(N−1)×p, and N=1, 2 . . . .

In an example embodiment, the network device determines a circumference of the circular buffer based on a quantity of REs included in the RMB and a quantity of modulation symbols carried on any one of the plurality of REs.

In an example embodiment, the third interval and the quantity of modulation symbols carried on one of the plurality of REs are relatively prime, and the third interval and the quantity of REs included in the RMB are relatively prime.

In an example embodiment, a mapping location, in the RMB, of an $N^{th}$ modulation symbol in the plurality of modulation symbols is $$\mod\left(\left\lceil \frac{Sequence_p(N)}{CEIL(OF)} \right\rceil, PRS\right),$$

where OF represents an average quantity of modulation symbols carried on one of the plurality of REs, CEIL(OF) represents rounding up OF, mod represents a modulo operation, PRS represents a maximum quantity of modulation symbols carried on the RMB, Sequence$_p$[c, c+p, c+2*p, . . . , c+PRS*p], c is a constant, p is a fourth interval, Sequence$_p$(N) is a value, in the sequence, corresponding to the $N^{th}$ symbol in the plurality of modulation symbols, Sequence$_p$(N)=c+(N−1)×p, and N=0, 1, 2 . . . .

In an example embodiment, a mapping location, in the RMB, of an $N^{th}$ modulation symbol in the plurality of modulation symbols is $$\mathrm{mod}\left(\left\lceil\frac{Sequence_p(N)}{CEIL(OF)}\right\rceil - 1, PRS\right) + 1,$$

where OF represents an average quantity of modulation symbols carried on one of the plurality of REs, CEIL(OF) represents rounding up OF, mod represents a modulo operation, PRS represents a maximum quantity of modulation symbols carried on the RMB, $Sequence_p[c, c+p, c+2*p, \ldots, c+PRS*p]$, c is a constant, p is a fourth interval, $Sequence_p(N)$ is a value, in the sequence, corresponding to the $N^{th}$ symbol in the plurality of modulation symbols, $Sequence_p(N)=c+(N-1)\times p$, and N=1, 2 . . . .

In an example embodiment, the information indicating the mapping mode includes any one or a combination of the following: the mapping matrix, a quantity of REs included in the RMB, a quantity of elements included in the mapping matrix, a quantity of all the mapping elements (MEs) in the mapping block (MB), an average maximum quantity of modulation symbols carried on one of the plurality of REs, a group number of the terminal, all mapping locations of the terminal in the RMB, a mapping start location of the terminal in the RMB, a quantity of modulation symbols mapped by the terminal to the RMB, an average quantity of modulation symbols mapped by the terminal to each of the plurality of REs, the first interval between the locations, in the mapping matrix, of any two adjacent modulation symbols in the plurality of modulation symbols, the second interval between the locations, in the $i^{th}$ row in the mapping matrix, of any two adjacent modulation symbols in the $i^{th}$ group of modulation symbols, the third interval between locations, in the MB, of any two adjacent modulation symbols in the plurality of modulation symbols, and the fourth interval between locations, in the MB, of any two adjacent modulation symbols in the plurality of modulation symbols; and the MB is an operation unit of the mapping mode, and one modulation symbol may be mapped to one ME.

According to a second non-limiting aspect of an example embodiment, a resource mapping method is provided. The method may be performed by a terminal, and the method may be implemented by using the following steps: A terminal obtains a mapping mode used for resource mapping during uplink transmission, where the mapping mode is used to indicate mapping locations of a plurality of modulation symbols in a resource mapping block (RMB), the plurality of modulation symbols include to-be-sent modulation symbols of the terminal, the RMB includes a plurality of resource elements (REs), and at least one RE carries at least two modulation symbols. The terminal determines, based on the mapping mode, mapping locations of the to-be-sent modulation symbols of the terminal in the resource mapping block (RMB). In this way, a plurality of modulation symbols sent by the terminal during the uplink transmission can evenly collide with modulation symbols of another terminal in the RMB, thereby helping reduce complexity of a receiver, and improving application effects of a resource mapping method in an MUD algorithm, a channel decoding algorithm, and an IC algorithm. When a system load is relatively heavy, there is a relatively large performance gain, and the fixed resource mapping mode is easy to describe and implement.

In an example embodiment, the mapping mode includes a mapping matrix; and columns in the mapping matrix are in a one-to-one correspondence with the REs included in the RMB, and a quantity of rows in the mapping matrix indicates a maximum quantity of modulation symbols carried on one any of the plurality of REs.

In an example embodiment, the mapping matrix is a basic mapping matrix, and the basic mapping matrix includes:

$$\begin{bmatrix} 1 & 1 & 2 & 2 & 3 & 3 & 4 & 4 & 5 & 5 & 6 & 6 \\ 7 & 9 & 11 & 8 & 12 & 7 & 10 & 11 & 9 & 12 & 8 & 10 \end{bmatrix};$$

$$\begin{bmatrix} 1 & 1 & 1 & 2 & 2 & 2 & 3 & 3 & 3 & 4 & 4 & 4 \\ 5 & 6 & 7 & 6 & 7 & 8 & 8 & 5 & 6 & 7 & 8 & 5 \end{bmatrix};$$

$$\begin{bmatrix} 1 & 1 & 1 & 2 & 2 & 2 & 2 & 3 & 3 & 3 & 3 \\ 4 & 5 & 6 & 4 & 6 & 4 & 5 & 6 & 5 & 6 & 4 & 5 \end{bmatrix}; \begin{bmatrix} 1 & 1 & 1 & 2 & 2 & 2 & 2 & 3 & 3 & 3 & 3 \\ 4 & 5 & 6 & 4 & 4 & 5 & 6 & 5 & 4 & 5 & 6 & 6 \\ 7 & 8 & 9 & 7 & 8 & 7 & 8 & 9 & 9 & 7 & 8 \end{bmatrix};$$

or $\begin{bmatrix} 1 & 1 & 1 & 1 & 1 & 1 & 2 & 2 & 2 & 2 & 2 & 2 \\ 3 & 3 & 3 & 4 & 4 & 4 & 3 & 3 & 3 & 4 & 4 & 4 \\ 5 & 5 & 6 & 6 & 5 & 5 & 6 & 6 & 5 & 5 & 6 & 6 \\ 7 & 8 & 7 & 8 & 7 & 8 & 7 & 8 & 7 & 8 & 7 & 8 \end{bmatrix}.$ In an example embodiment, the mapping matrix is a transformed mapping matrix, and the transformed mapping matrix is obtained after the basic mapping matrix is transformed by using any one or a combination of the following: based on that a quantity of scheduled terminals is less than a quantity of terminals carried in the basic mapping matrix, mapping locations of some terminals in the basic mapping matrix are set to null; based on that a quantity of modulation symbols actually mapped by a terminal is less than a quantity of modulation symbols that are of one user and that are carried in the basic mapping matrix, mapping locations of some modulation symbols in the basic mapping matrix are set to null; based on that a quantity of modulation symbols actually mapped by a terminal is greater than a quantity of modulation symbols that are of one user and that are carried in the basic mapping matrix, modulation symbols of one terminal are placed in mapping locations occupied by a plurality of terminals in the basic mapping matrix; or some mapping locations in any quantity of basic mapping matrices are combined.

In an example embodiment, the terminal maps the to-be-sent modulation symbols into a circular buffer at a fixed interval; and the terminal determines mapping locations of the to-be-sent modulation symbols in the RMB based on locations of the to-be-sent modulation symbols in the circular buffer.

In an example embodiment, a location m, in the circular buffer, of an $N_{UE-n}^{th}$ modulation symbol in the to-be-sent modulation symbols is $\mathrm{mod}(Sequence_{p,UE-n}(N_{UE-n}), MRS)$, and a mapping location r of the $N_{UE-n}^{th}$ modulation symbol in the RMB is $\mathrm{floor}(m/\mathrm{ceil}(OF))$, where mod represents a modulo operation, floor represents rounding down, the sequence $Sequence_{p,UE-n}=[c_{UE-n}, c_{UE-n}p, c_{UE-n}+2*p, \ldots, c_{UE-n}+L*p]$, L is a quantity of to-be-sent modulation symbols, $c_{UE-n}$ is a constant, MRS is a quantity of all mapping elements (MEs) in a mapping block (MB), the MB is an operation unit of the mapping mode, one modulation symbol may be mapped to one ME, PRS represents a maximum quantity of modulation symbols carried on the RMB, p is the fixed interval, $Sequence_{p,UE-n}(N_{UE-n})$ is a value, in the sequence, corresponding to the $N_{UE-n}^{th}$ symbol in the to-be-sent modulation symbols, $Sequence_{p,UE-n}(N_{UE-n})=c_{UE-n}+(N_{UE-n}-1)\times p$, and N=1, 2, . . . .

In an example embodiment, $c_{UE-n}=\text{mod}(UE\text{-}ID-1, MRS)+1$, and UE-ID represents a user identifier of the terminal.

In an example embodiment, a circumference of the circular buffer is determined by the quantity of to-be-sent modulation symbols.

In an example embodiment, that the terminal determines, based on the mapping mode, mapping locations of the to-be-sent modulation symbols of the terminal in the resource mapping block (RMB) may be implemented in the following manner a mapping location, in the RMB, of an $N_{UE-n}^{th}$ modulation symbol in the to-be-sent modulation symbols is $$\text{mod}\left(\left\lceil \frac{Sequence_{p,UE-n}(N_{UE-n})}{CEIL(OF)} \right\rceil, PRS\right),$$

where OF represents an average quantity of modulation symbols carried on one of the plurality of REs, CEIL(OF) represents rounding up OF, mod represents a modulo operation, PRS represents a maximum quantity of modulation symbols carried on the RMB, the sequence $Sequence_{p,UE-n}=[c_{UE-n}, c_{UE-n}+p, c_{UE-n}+2*p, \ldots, c_{UE-n}+L*p]$, L is a quantity of to-be-sent modulation symbols, $c_{UE-n}$ is a constant, p is a fixed interval, $Sequence_{p,UE-n}(N_{UE-n})$ is a value, in the sequence, corresponding to the $N_{UE-n}^{th}$ symbol in the to-be-sent modulation symbols, $Sequence_{p,UE-n}(N_{UE-n})=c_{UE-n}+(N_{UE-n}-1)\times p$, and $N_{UE-n}=0, 1, 2 \ldots$.

In an example embodiment, that the terminal determines, based on the mapping mode, mapping location of the to-be-sent modulation symbols of the terminal in the resource mapping block (RMB) may be implemented by performing the following step: a mapping location, in the RMB, of an $N_{UE-n}^{th}$ modulation symbol in the to-be-sent modulation symbols is $$\text{mod}\left(\left\lceil \frac{Sequence_{p,UE-n}(N_{UE-n})}{CEIL(OF)} \right\rceil - 1, PRS\right)+1,$$

where OF represents an average quantity of modulation symbols carried on one of the plurality of REs, CEIL(OF) represents rounding up OF, mod represents a modulo operation, PRS represents a maximum quantity of modulation symbols carried on the RMB, the sequence $Sequence_{p,UE-n}=[c_{UE-n}, c_{UE-n}+p, c_{UE-n}+2*p, \ldots, c_{UE-n}+L*p]$, L is a quantity of to-be-sent modulation symbols, $c_{UE-n}$ is a constant, p is a fixed interval, $Sequence_{p,UE-n}(N_{UE-n})$ is a value, in the sequence, corresponding to the $N_{UE-n}^{th}$ symbol in the to-be-sent modulation symbols, $Sequence_{p,UE-n}(N_{UE-n})=c_{UE-n}+(N_{UE-n}-1)\times p$, and $N_{UE-n}=0, 1, 2 \ldots$.

In an example embodiment, the fixed interval and the quantity of modulation symbols carried on one of the plurality of REs are relatively prime, and the interval and the quantity of REs included in the RMB are relatively prime.

In an example embodiment, that a terminal obtains a mapping mode used for resource mapping during uplink transmission may be implemented by performing the following step: The terminal receives information indicating the mapping mode from the network device; the terminal determines, based on a user identifier UE-ID, information used to indicate the mapping mode; the terminal determines, according to a standard protocol, information used to indicate the mapping mode; or the terminal obtains pre-stored information used to indicate the mapping mode.

In an example embodiment, the information indicating the mapping mode includes any one or a combination of the following: the mapping matrix, a quantity of REs included in the RMB, a quantity of elements included in the mapping matrix, a quantity of all the mapping elements (MEs) in the mapping block (MB), an average maximum quantity of modulation symbols carried on one of the plurality of REs, a group number of the terminal, all mapping locations of the terminal in the RMB, a mapping start location of the terminal in the RMB, a quantity of modulation symbols mapped by the terminal to the RMB, an average quantity of modulation symbols mapped by the terminal to each of the plurality of REs, the first interval between the locations, in the mapping matrix, of any two adjacent modulation symbols in the plurality of modulation symbols, the second interval between the locations, in the $i^{th}$ row in the mapping matrix, of any two adjacent modulation symbols in the $i^{th}$ group of modulation symbols, the third interval between locations, in the MB, of any two adjacent modulation symbols in the plurality of modulation symbols, and the fourth interval between locations, in the MB, of any two adjacent modulation symbols in the plurality of modulation symbols; or the MB is an operation unit of the mapping mode, and one modulation symbol may be mapped to one ME.

According to a third non-limiting aspect of an example embodiment, a resource mapping indication apparatus is provided. The apparatus is applied to a network device or the apparatus is a network device. The apparatus has a function of implementing the method according to any one of the first aspect or the example embodiments of the first aspect, and includes corresponding means for performing the steps or functions described in the foregoing aspects. The steps or functions may be implemented by using software, hardware (for example, a circuit), or a combination of hardware and software.

In an example embodiment, the apparatus includes one or more processors and a communications unit. The one or more processors are configured to support the resource mapping indication apparatus in performing a function in the foregoing method, for example, performing channel measurement on some or all of a plurality of narrowbands based on a first indication. The communications unit is configured to support the resource mapping indication apparatus in communicating with another device, to implement a receiving function and/or a sending function, for example, sending, to a terminal, information indicating a mapping mode.

Optionally, the apparatus may further include one or more memories. The memory is configured to be coupled to the processor, and the memory stores a program instruction and/or data that are/is necessary for the apparatus. The one or more memories may be integrated with the processor, or may be disposed independent of the processor. This is not limited in embodiments of the present disclosure.

The communications unit may be a transceiver or a transceiver circuit. Optionally, the transceiver may alternatively be an input/output circuit or an interface.

The apparatus may alternatively be a communications chip. The communications unit may be an input/output circuit or an interface of the communications chip.

In another embodiment, the resource mapping indication apparatus includes a transceiver, a processor, and a memory. The processor is configured to control the transceiver or an input/output circuit to receive and send a signal, and the memory is configured to store a computer program. The processor is configured to run the computer program in the memory, to enable the resource mapping indication apparatus to perform the method according to any one of the first aspect or the example embodiments of the first aspect.

According to a fourth non-limiting aspect of an example embodiment, a resource mapping apparatus is provided. The apparatus is applied to a terminal or the apparatus is a terminal. The apparatus has a function of implementing the method according to any one of the second aspect or the example embodiments of the second aspect, and includes corresponding means for performing the steps or functions described in the foregoing aspect. The steps or functions may be implemented by using software, hardware (for example, a circuit), or a combination of hardware and software.

In an example embodiment, the apparatus includes one or more processors and a communications unit. The one or more processors are configured to support the resource mapping apparatus in performing a function in the foregoing method, for example, obtaining a mapping mode used for resource mapping during uplink transmission, and determining, based on the mapping mode, mapping locations of to-be-sent modulation symbols of the terminal in a resource mapping block (RMB). The communications unit is configured to support the resource mapping apparatus in communicating with another device, to implement a receiving function and/or a sending function, for example, receiving information that indicates the mapping mode and that is sent by a network device.

Optionally, the apparatus may further include one or more memories. The memory is configured to be coupled to the processor, and the memory stores a program instruction and/or data that are/is necessary for the apparatus. The one or more memories may be integrated with the processor, or may be disposed independent of the processor. This is not limited in embodiments of the present disclosure.

The communications unit may be a transceiver or a transceiver circuit. Optionally, the transceiver may alternatively be an input/output circuit or an interface.

The apparatus may alternatively be a communications chip. The communications unit may be an input/output circuit or an interface of the communications chip.

In another embodiment, the resource mapping apparatus includes a transceiver, a processor, and a memory. The processor is configured to control the transceiver or an input/output circuit to receive and send a signal, and the memory is configured to store a computer program. The processor is configured to run the computer program in the memory, to enable the apparatus to perform the method according to any one of the second aspect or the embodiments of the second aspect.

According to a fifth non-limiting aspect of an example embodiment, a system is provided. The system includes the apparatuses according to the third aspect and the fourth aspect.

According to a sixth non-limiting aspect of an example embodiment, a computer-readable storage medium is provided, and is configured to store a computer program. The computer program includes an instruction used to perform the method according to any one of the first aspect or the embodiments of the first aspect.

According to a seventh non-limiting aspect of an example embodiment, a computer program product is provided. The computer program product includes computer program code. When the computer program code is run on a computer, the computer is enabled to perform the method according to any one of the first aspect or the embodiments of the first aspect.

According to an eighth non-limiting aspect of an example embodiment, a computer-readable storage medium is provided, and is configured to store a computer program. The computer program includes an instruction used to perform the method according to any one of the second aspect or the embodiments of the second aspect.

According to a ninth non-limiting aspect of an example embodiment, a computer program product is provided. The computer program product includes computer program code. When the computer program code is run on a computer, the computer is enabled to perform the method according to any one of the second aspect or the embodiments of the second aspect.

DESCRIPTION OF EMBODIMENTS

Figure 1:
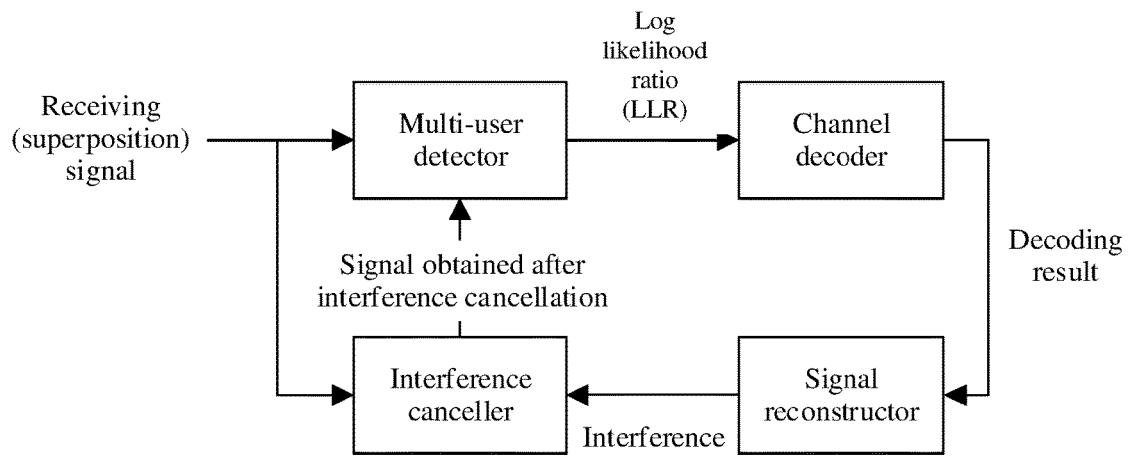
FIG. 1 is a schematic diagram of a framework of a receiver that is based on multi-user detection and interference cancellation in the existing technology.

Embodiments of this application provide a resource mapping method and apparatus, and relate to a fixed resource mapping mode within a specific time-frequency resource range, for example, a fixed resource mapping mode in a resource mapping block (RMB). A plurality of terminals use the fixed mapping mode on each RMB of a segment of resources, and the plurality of modulation symbols sent during the uplink transmission can evenly collide in the RMB, thereby helping reduce complexity of a receiver, and improving application effects of a resource mapping method in an MUD algorithm, a channel decoding algorithm, and an IC algorithm. When a system load is relatively heavy, there is a relatively large performance gain, and the fixed resource mapping mode is easy to describe and implement. The resource mapping block may also be referred to as a resource block (RB), but is not limited to this name.

The method and the apparatus are based on a same inventive concept. Because a problem-resolving principle of the method is similar to that of the apparatus, implementations of the apparatus and the method may mutually refer to each other, and no repeated description is provided. In descriptions of the embodiments of this application, the term "and/or" describes an association relationship for associated objects and represents that three relationships may exist. For example, A and/or B may represent the following three cases: Only A exists, both A and B exist, and only B exists. The character "/" generally represents an "or" relationship between the associated objects. In this application, "at least one" means one or more, and "a plurality of" means two or more. In addition, it should be understood that in the present disclosure, terms such as "first" and "second" are merely used for differentiation and description, but should not be understood as an indication or implication of relative importance, or should not be understood as an indication or implication of a sequence. Explanations of symbols, parameters, reference numerals, terms, or the like in the present disclosure are applicable to the entire specification.

The method provided in the embodiments of this application may be applied to a $4^{th}$ generation (4G) communications system, a $5^{th}$ generation (5G) communications system, or various future communications systems. Specifically, the method may be applied to an MTC communication scenario, a NB-IoT communication scenario, or any transmission scenario of a small downlink data packet.

The following describes in detail the embodiments of this application with reference to the accompanying drawings.

Figure 2:
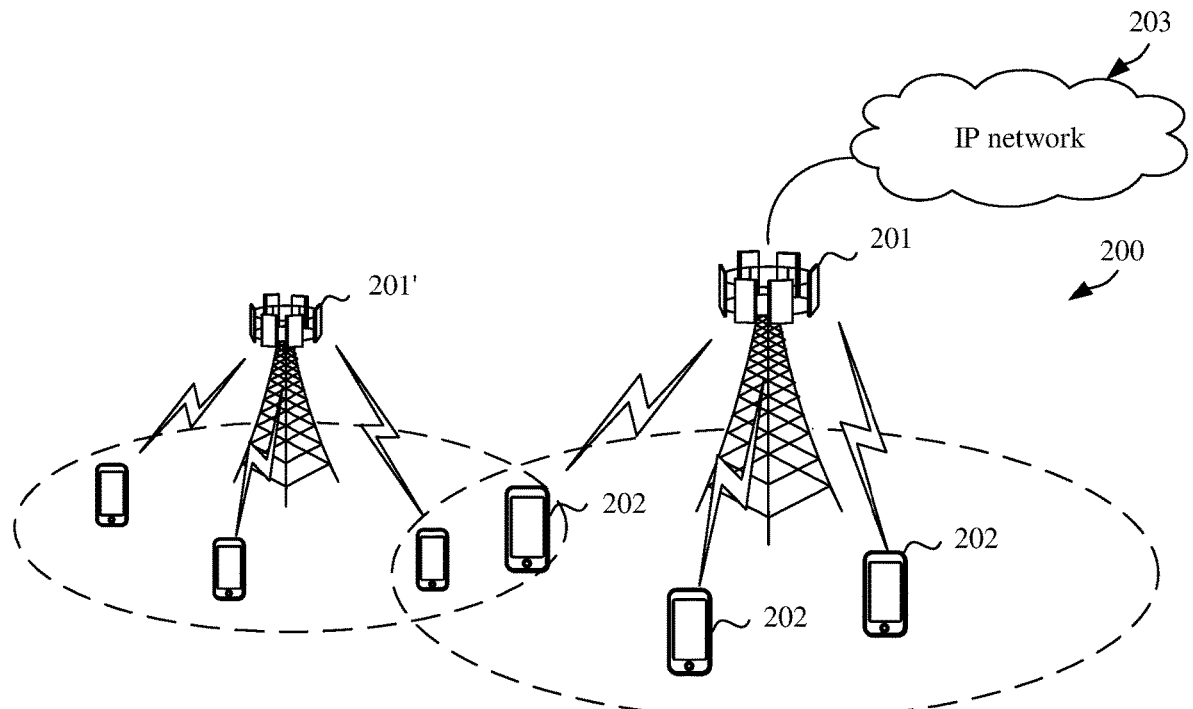
FIG. 2 is a schematic diagram of an architecture of a communications system according to an embodiment of this application.

FIG. 2 shows an architecture of an example communications system 200 to which a resource mapping method according to an embodiment of this application is applicable. As shown in FIG. 2, the communications system 200 includes a network device 201 and one or more terminals 202. When the communications system 200 includes a core network, the network device 201 may be further connected to the core network. The network device 201 may communicate with an IP network 203 by using the core network. The IP network 203 may be the internet, a private IP network, or any other data network. The network device 201 provides a service for the terminal 202 within coverage. For example, as shown in FIG. 2, the network device 201 provides wireless access for the one or more terminals 202 within the coverage of the network device 201. The communications system 200 may include a plurality of network devices, for example, may further include a network device 201'. There may be an overlapping area between coverage of network devices. For example, there is an overlapping area between coverage of the network device 201 and that of the network device 201'. The network devices may further communicate with each other. For example, the network device 201 may communicate with the network device 201'.

The network device 201 is a node in a radio access network (RAN), and may also be referred to as a base station, or may be referred to as a RAN node (or a device). Currently, some examples of the network device 201 are a general NodeB (gNB), a new radio NodeB (NR-NB), a transmission reception point (TRP), an evolved NodeB (eNB), a radio network controller (RNC), and a NodeB (NB), a base station controller (BSC), a base transceiver station (BTS), a home base station (for example, a home evolved NodeB, HeNB, or a home Node B, HNB), a baseband unit (BBU), a wireless fidelity (Wi-Fi) access point (AP), a network side device in a 5G communications system or a future communications system, or the like.

The terminal 202 is also referred to as user equipment (UE), a mobile station (MS), a mobile terminal (MT), or the like, and is a device that provides voice and/or data connectivity for a user, or may be an internet of things device. For example, the terminal 202 includes a handheld device, a vehicle-mounted device, or the like that has a wireless connection function. For example, the terminal 202 may be a mobile phone, a tablet, a notebook computer, a palmtop computer, a mobile internet device (MID), a wearable device (for example, a smartwatch, a smart band, or a pedometer), a vehicle-mounted device (for example, an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self-driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an unmanned aerial vehicle, or an aircraft), or the like. In descriptions about a user in the embodiments of this application, the user may be understood as a terminal.

In the present disclosure, mapping locations of a plurality of modulation symbols of a plurality of terminals in one RMB may be described by using a mapping mode. An uplink transmission resource occupied by the terminal includes one or more RMBs, and the resource mapping mode may be reused for each RMB. The resource mapping mode may be considered as a mapping pattern from a modulation symbol to a resource element. The modulation symbol may also be understood as a user symbol. For example, a terminal converts a to-be-sent information bit into a codeword bit by using a channel encoder, and modulates the codeword bit into a modulation symbol by using a modulator. The resource element is a minimum division granularity in one RMB. For example, one time-frequency unit is referred to as a resource element. The terminal maps the modulation symbol to a resource element in the RMB by using one or more mappers, to generate a signal, and sends the signal.

In the present disclosure, a mapper may be used to map a modulation symbol carried on an RMB, and mapping modes (or referred to as mapping patterns) used by mappers are consistent. One RMB includes a plurality of resource elements (REs), and one or more modulation symbols may be mapped to one RE. When modulation symbols of a plurality of different terminals are mapped to one RE, the modulation symbols of the different terminals collide. In the present disclosure, a mapping mode of a plurality of modulation symbols on one RMB is determined by using a mapping matrix, a mapping procedure, or the like. The RMB may also be considered as a resource block (RB), and the RMB is used to describe mapping from a physical channel to a resource element. One RMB includes a plurality of consecutive time-frequency resources. If a time-frequency resource granularity is an RE, one RMB includes a plurality of consecutive REs. For example, in LTE, one RMB includes a plurality of consecutive symbols in time domain and a plurality of consecutive subcarriers in frequency domain. In the embodiments of the present disclosure, a mapping mode is described based on one RMB, and a sequence number of the RMB is not marked. It may be understood that an uplink resource occupied by the terminal includes a plurality of RMBs, and for a mapping mode of each RMB, refer to descriptions in the present disclosure. In the present disclosure, a quantity of REs included in one RMB may be 4, 6, 8, 12, 16, 24, 36, 48, 72, 144, or the like.

Figure 3:
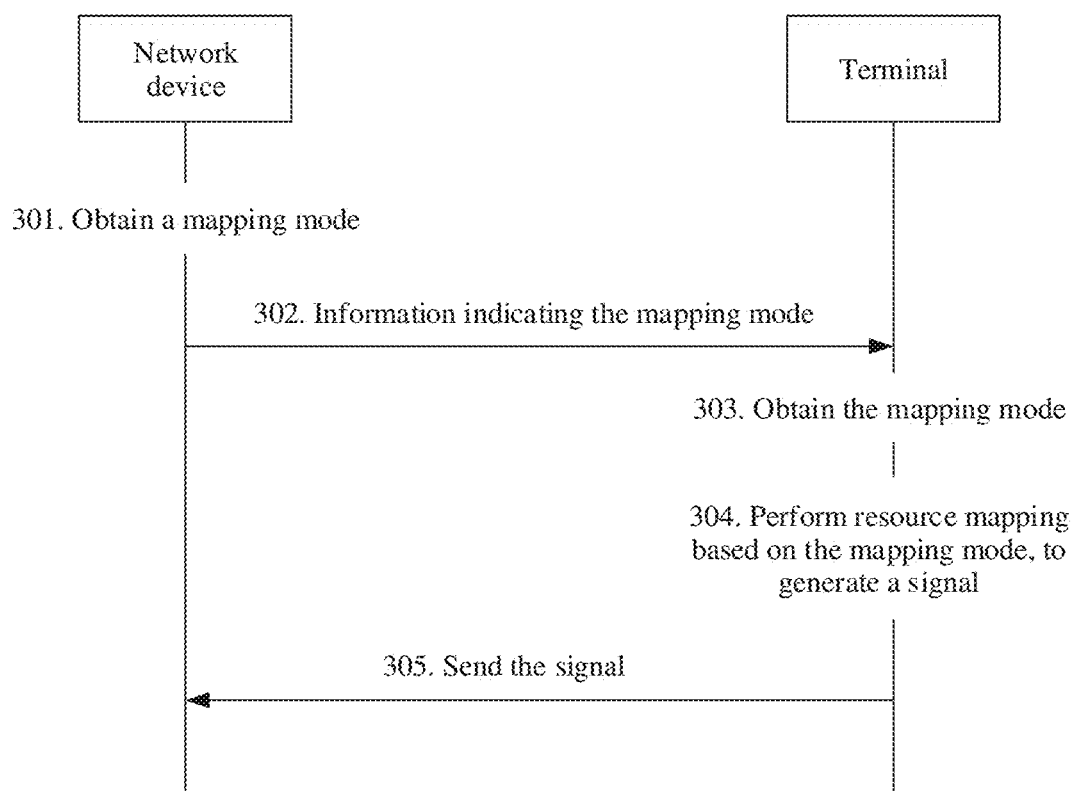
FIG. 3 is a schematic diagram of a resource mapping pattern according to an embodiment of this application.

As shown in FIG. 3, a specific procedure of a resource mapping method provided in an embodiment of the present disclosure is described below. Any quantity of consecutive or inconsecutive steps in the following process may separately form a solution that needs to be protected in the present disclosure, and remaining steps are optional steps.

Step 301. A network device obtains a mapping mode used for resource mapping during uplink transmission.

The mapping mode is used to indicate mapping locations of a plurality of modulation symbols in an RMB, the RMB includes a plurality of REs, and at least one of the plurality of REs carries at least two modulation symbols.

Step 302. The network device sends, to a terminal, information indicating the mapping mode.

Step 303. The terminal obtains the mapping mode used for the resource mapping during the uplink transmission.

Specifically, the terminal may receive, from the network device based on Step 302, the information indicating the mapping mode. The terminal may alternatively obtain the mapping mode in another manner. For example, the terminal determines, according to a standard protocol, information used to indicate the mapping mode; the terminal obtains pre-stored information used to indicate the mapping mode; or the terminal determines, based on a UE-ID, information used to indicate the mapping mode.

Step 304. The terminal determines, based on the mapping mode, mapping locations of to-be-sent modulation symbols in the RMB, and maps the to-be-sent modulation symbols to the corresponding mapping locations in the RMB, to generate a to-be-sent signal.

Step 305. The terminal sends the to-be-sent signal to the network device, and the network device receives the signal.

Specifically, the mapping mode designed in the present disclosure includes three representation forms: a mapping mode of a mapping matrix, a mapping mode of a circular buffer, and a mapping mode of a mapping formula. In an actual application, the mapping mode of the mapping matrix may also be implemented by using a circular buffer and a mapping formula. The several mapping modes are separately described below.

1. Mapping Mode of the Mapping Matrix

First, a concept of the mapping matrix used in the present disclosure is described, to facilitate understanding of the present disclosure.

The mapping matrix may be used to describe mapping locations of a plurality of modulation symbols of a plurality of terminals in one RMB. Columns in the mapping matrix are in a one-to-one correspondence with REs included in the RMB, one column is corresponding to one RE, and a quantity of rows in the mapping matrix indicates a quantity of modulation symbols carried on any of the REs. Any column of vectors indicates modulation symbols carried on a corresponding RE. A value of an element in the mapping matrix may indicate user information. For example, the user information may include a user sequence number or a user identifier, and is used to distinguish between different terminals or users.

Figure 4:
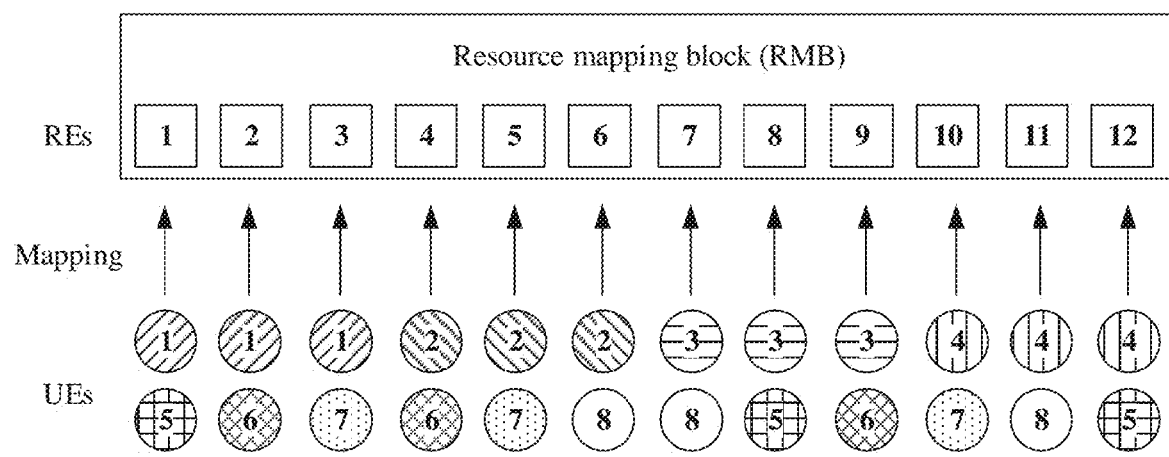
FIG. 4 is a schematic flowchart of a resource mapping method according to an embodiment of this application.

As shown in FIG. 4, one RMB may carry modulation symbols of eight terminals, and each terminal may map three modulation symbols to one RMB. One RMB includes 12 REs, which are represented by 1, 2, 3, . . . , and 12. User information of the eight terminals is represented by 1, 2, 3 . . . , and 8. A total quantity of modulation symbols that are of the eight terminals and that are mapped to the RMB is 8*3=24. One RE carries two modulation symbols. For example, an RE 1 carries a modulation symbol of a user 1 and a modulation symbol of a user 5, an RE 2 carries the modulation symbol of the user 1 and a modulation symbol of a user 6, and an RE 3 carries the modulation symbol of the user 1 and a modulation symbol of a user 7. The mapping process or the mapping pattern shown in FIG. 4 is represented by using a mapping matrix, and the mapping matrix is $$\begin{bmatrix} 1 & 1 & 1 & 2 & 2 & 2 & 3 & 3 & 3 & 4 & 4 & 4 \\ 5 & 6 & 7 & 6 & 7 & 8 & 8 & 5 & 6 & 7 & 8 & 5 \end{bmatrix}.$$

Based on a concept of the mapping matrix, for ease of description, several concepts may be defined in the present disclosure.

(1) A physical resource size (PRS) indicates a quantity of REs in one RMB, and in a mapping matrix, is represented as a quantity of columns in the mapping matrix.

(2) A mapping block (MB) is a reusable mapping mode, and is an operation unit of a basic mapping algorithm (or mapping protocol), and a mapping result of the mapping block may be represented by a mapping matrix. One MB may represent all mappable locations in one mapping matrix.

(3) A mapping element (ME) represents a mappable location in a mapping matrix, one element in the mapping matrix occupies one mapping location, and one modulation symbol may be mapped to one mapping location.

(4) A mapping resource size (MRS) indicates a quantity of all MEs in one MB, and in a mapping matrix, is represented as a total quantity of elements in the mapping matrix.

(5) An overloading factor (OF) indicates an average quantity of modulation symbols carried on one of the REs.

$$OF = \frac{\sum_{n=1}^{K} N_{UE-n}}{PRS},$$

where $N_{UE-n}$ represents a quantity of modulation symbols mapped by a user UE-n to one RMB, K is a quantity of users (or a quantity of terminals) that map modulation symbols to one RMB, and $\sum_{n=1}^{K} N_{UE-n}$ is a total quantity of modulation symbols mapped by K users to one RMB.

(6) A maximum overloading factor is calculated by CEIL (OF). CEIL(OF) represents rounding up OF, $$CEIL(OF) = \left\lceil \frac{\sum_{n=1}^{K} N_{UE-n}}{PRS} \right\rceil,$$

and ⌈X⌉ represents rounding up X. In a mapping matrix, the maximum overloading factor is represented as a quantity of rows in the mapping matrix.

Using the mapping matrix shown in FIG. 4 as an example, K=8, and PRS=12. In this case, $$OF = \frac{\sum_{n=1}^{K} N_{UE-n}}{PRS} = \frac{\sum_{n=1}^{8} N_{UE-n}}{12} = 2, \text{ and } CEIL(OF) = \left\lceil \frac{\sum_{n=1}^{K} N_{UE-n}}{PRS} \right\rceil = 2.$$

(7) A mapping ratio (MR) may also be referred to as a mapping density, is used to indicate an average quantity of modulation symbols mapped by one user to each RE, and is determined based on a quantity of REs included in one RMB and a quantity of modulation symbols that are of one user and that can be carried on one RMB. One RMB includes M REs. For one terminal, N modulation symbols of the terminal are mapped to the M REs, and an average quantity of modulation symbols mapped to one RE is N/M. For UE-n, a mapping ratio is $MR_{UE-n}=N_{UE-n}/M_{UE-n}$. UE-n indicates a terminal numbered n. If a plurality of modulation symbols of K terminals are carried on the RMB, a value of n may be 1, 2, ..., or K, or may be 0, 1, ..., or K−1.

The following mainly describes several example manners of obtaining a mapping matrix provided in embodiments of the present disclosure.

Manner 1

The network device obtains a plurality of sequentially arranged modulation symbols, determines a quantity of columns and a quantity of rows in a mapping matrix, and determines locations of the plurality of sequentially arranged modulation symbols in the mapping matrix, to generate the mapping matrix.

Specifically, the network device may sort a plurality of terminals based on user sequence numbers or user identifiers. For example, there are K terminals that are to send modulation symbols. After being sorted, the K terminals are denoted as UE-1, UE-2, ..., and UE-K. The modulation symbols of the plurality of sorted terminals are spread to obtain a plurality of sequentially arranged modulation symbols. For example, if $N_{UE-n}$ to-be-sent modulation symbols of a terminal UE-n are spread into a sequence $$Symbol_{UE-n} = \{S_1^{UE-n}, S_2^{UE-n}, \cdots, S_{N_{UE-n}}^{UE-n}\},$$

modulation symbols of each of the K sorted terminals are spread, to obtain a sequence $$Symbol_{All} = \{S_1^{UE-1}, S_2^{UE-1}, \cdots, S_{N_{UE-1}}^{UE-1}, S_1^{UE-2},$$
$$S_2^{UE-2}, \cdots, S_{N_{UE-2}}^{UE-2}, \cdots\cdots, S_1^{UE-K}, S_2^{UE-K}, \cdots, S_{N_{UE-K}}^{UE-K}\}$$

of all modulation symbols of the K terminals. If K=8 and $N_{UE-1}=N_{UE-2}=\ldots=N_{UE-K}=3$, the plurality of sequentially arranged modulation symbols form a sequence {1 1 1 2 2 2 3 3 3 4 4 4 5 5 5 6 6 6 7 7 7 8 8 8}. In an actual application, quantities of modulation symbols mapped by different users to one RMB may be different.

The network device determines a size of the mapping matrix, for example, determines a quantity of columns and a quantity of rows in the mapping matrix. Specifically, the quantity of rows in the mapping matrix is determined based on a PRS, that is, a quantity of columns in the mapping matrix is determined based on a quantity of REs included in one RMB.

In a grant-based scenario, the network device may learn of a total quantity K of terminals mapped to one RMB and a total quantity $N_{UE-n}$ of modulation symbols mapped by each terminal to one RMB. In this case, the network device determines a value of CEIL(OF) based on actual values of K and $N_{UE-n}$ and a calculation formula of CEIL(OF), that is, determines the quantity of columns in the mapping matrix.

In a grant-free scenario, the network device may not accurately learn of a total quantity K of terminals mapped to one RMB and a total quantity $N_{UE-n}$ of modulation symbols mapped by each terminal to one RMB. In this case, the network device may reserve a resource based on an actual situation, or the network device may negotiate with the terminal about a value of CEIL(OF) or a related parameter used to determine CEIL(OF).

To obtain the plurality of sequentially arranged modulation symbols and determine the size of the mapping matrix, the network device needs to determine locations of the plurality of sequentially arranged modulation symbols in the mapping matrix. Specifically, that the network device determines the locations of the plurality of sequentially arranged modulation symbols in the mapping matrix may be understood as that the network device maps the plurality of sequentially arranged modulation symbols into the mapping matrix. In an example embodiment, the network device sequentially maps the plurality of sequentially arranged modulation symbols into the mapping matrix at a specific interval. The specific interval may be denoted as a first interval. The first interval is a fixed interval, and the first interval may be relatively prime to the quantity of rows in the mapping matrix, and is relatively prime to the quantity of columns in the mapping matrix. In this way, repeated mapping of modulation symbols to one ME can be prevented. For example, PRS=12, and CEIL(OF)=2, that is, the quantity of rows in the mapping matrix is 2, and the quantity of columns in the mapping matrix is 12. In this case, optional values of the first interval include numbers that are relatively prime to both 2 and 12, such as 1, 5, 7, 11, 13, 17, and 19.

The network device maps the plurality of sequentially arranged modulation symbols into the mapping matrix one by one based on the first interval, where any two adjacent modulation symbols in the plurality of sequentially arranged modulation symbols may be represented by a first modulation symbol and a second modulation symbol, and the second modulation symbol is a next modulation symbol of the first modulation symbol. It may be understood that, starting from a first mapping location of the first modulation symbol in the mapping matrix, after mapping locations in the first interval are traversed by row to a second mapping location, the second mapping location is a mapping location of the second modulation symbol in the mapping matrix. Alternatively, starting from a first mapping location of the first modulation symbol in the mapping matrix, after mapping locations in the first interval are traversed by column to a second mapping location, the second mapping location is a mapping location of the second modulation symbol in the mapping matrix. The traversal by row means that traversal is performed row by row in a column in which the first mapping location is located. If a remaining location in the column in which the first mapping location is located cannot reach the first interval, traversal continues to be performed from a next column of the column in which the first mapping location is located until the first interval is reached, and the second mapping location is determined. If the column in which the first mapping location is located is the last column in the mapping matrix, the next column of the column in which the first mapping location is located is the first column in the mapping matrix. In this way, cyclic mapping is performed. Similarly, the traversal by column means that traversal is performed column by column in a row in which the first mapping location is located. If a remaining location in the row in which the first mapping location is located cannot reach the first interval, traversal continues to be performed from a next row of the row in which the first mapping location is located until the first interval is reached, and the second mapping location is determined. If the row in which the first mapping location is located is the last row in the mapping matrix, the next row of the row in which the first mapping location is located is the first row in the mapping matrix. In this way, cyclic mapping is performed.

Figure 5:
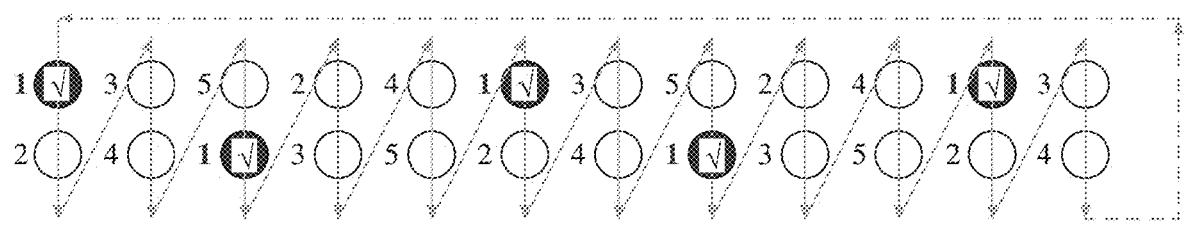
FIG. 5 is a schematic diagram of a mapping mode based on an interval according to an embodiment of this application.

That the first interval is traversed by column is used as an example. It is assumed that PRS=12 and CEIL(OF)=2, that is, the quantity of rows in the mapping matrix is 2, the quantity of columns is 12, and a value of the first interval is 5. In this case, the locations that are of the plurality of sequentially arranged modulation symbols in the mapping matrix and that are determined based on the first interval may be shown in FIG. 5. FIG. 5 shows a mapping matrix or an MB. Each circle represents a mappable location in the mapping matrix, or each circle represents an ME in the MB. A solid circle numbered 1 represents a modulation symbol mapped in the mapping matrix. From left to right, five consecutively mapped modulation symbols in the plurality of sequentially arranged modulation symbols may be modulation symbols of one user, or may be modulation symbols of a plurality of users. In FIG. 5, a solid arrow represents a sequence of traversal by column, and a dashed arrow represents that when the last column is traversed, traversal continues to be performed cyclically from the first column. A hollow circle in FIG. 5 represents a mapping location skipped when a modulation symbol is mapped. If the value of the first interval is 5, 5-1=4 locations are skipped, and sequence numbers 2, 3, 4, and 5 represent the skipped mapping locations.

Figure 6:
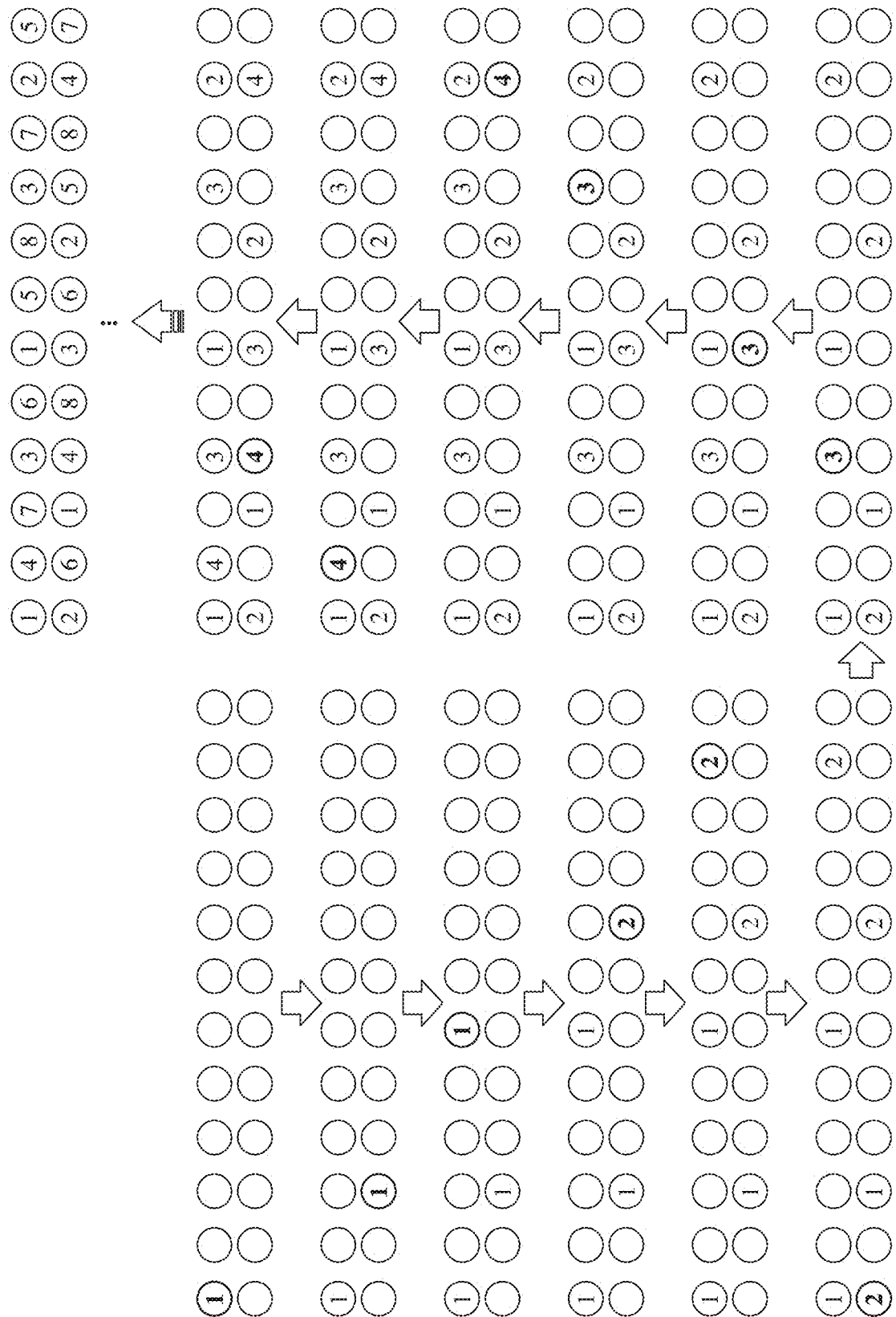
FIG. 6 a schematic diagram of a mapping mode based on coprime numbers according to an embodiment of this application.

In the foregoing example, K=8, $N_{UE-1}=N_{UE-2}=\ldots=N_{UE-K}=3$, PRS=12, and CEIL(OF)=2, that is, the quantity of rows in the mapping matrix is 2, the quantity of columns is 12, the value of the first interval is 5, and the quantity of sequentially arranged modulation symbols is 8*3=24. In this case, the network device sequentially maps the 24 sequentially arranged modulation symbols into the mapping matrix based on the interval value 5. FIG. 6 shows a partial process of mapping modulation symbols one by one. The size of the mapping matrix is 2 rows and 12 columns. In FIG. 6, each circle represents one ME, that is, one mappable location. A shaded circle is a mapping location determined for a current modulation symbol in the mapping matrix, and a value in the shaded circle represents user information and is used to distinguish between different users. For example, the user information is a user sequence number. Arrows represent a sequence of one-by-one mapping. FIG. 6 shows mapping locations of some modulation symbols starting from a first modulation symbol. An arrow finally points to a mapping result, indicating mapping locations of all modulation symbols in the mapping matrix. Correspondingly, the mapping matrix $$\begin{bmatrix} 1 & 4 & 7 & 3 & 6 & 1 & 5 & 8 & 3 & 7 & 2 & 5 \\ 2 & 6 & 1 & 4 & 8 & 3 & 6 & 2 & 5 & 8 & 4 & 7 \end{bmatrix}$$

may be determined.

Manner 2

The network device groups a plurality of terminals (or a plurality of users), and spread modulation symbols of terminals in each group obtained through the grouping, to obtain a plurality of groups of modulation symbols. The plurality of groups of modulation symbols may form the foregoing plurality of sequentially arranged modulation symbols. A quantity of columns and a quantity of rows in a mapping matrix are determined, and locations of the plurality of sequentially arranged modulation symbols in the mapping matrix are determined, to generate the mapping matrix.

The network device may group the plurality of users based on one or more of a mapping ratio, a power domain, a code domain, or a spatial domain. The mapping ratio indicates an average quantity of modulation symbols mapped by one user to each RE. Grouping may be performed according to a mapping sequence that mapping ratios are in descending order, so that a modulation symbol of a terminal with a large mapping ratio may be first mapped after the grouping and a modulation symbol of a terminal with a small mapping ratio is then mapped. If grouping is performed based on a power domain, the network device may place terminals with similar power into one group based on values of transmit power or receive power of the terminals. If grouping is performed based on a code domain, based on spreading sequences used by the terminals, the network device may place terminals that use a same sequence into one group, or place terminals that use sequences with relatively high mutual interference into one group. If grouping is performed based on a spatial domain, the network device may place, based on one or more parameters of locations, angles of arrival, antennas, or space-time codes of the terminals, terminals with similar parameters into one group.

For example, there are K terminals that are to send modulation symbols. After being sorted, the K terminals are represented by UE-1, UE-2, . . . , and UE-K. The network device places the K terminals into CEIL(OF) groups:

Group-1={UE-1, . . . , UE-k1},

Group-2={UE-(k1+1), UE-(k1+k2)},

. . . , and

Group-CEIL(OF)={UE-(k:ceil(OF)+1), . . . , UE-K}.

The modulation symbols of the plurality of grouped terminals are spread to obtain the plurality of groups of sequentially arranged modulation symbols, where the plurality of groups of sequentially arranged modulation symbols may form the plurality of sequentially arranged modulation symbols. The $N_{UE-n}$ to-be-sent modulation symbols of the terminal UE-n are spread into the sequence $$Symbol_{UE-n} = \{S_1^{UE-n}, S_2^{UE-n}, \cdots, S_{N_{UE-n}}^{UE-n}\}.$$

In this case, modulation symbols of each terminal in a first group of terminals that are obtained through the grouping are spread, to obtain a sequence $$Symbol_{Group-1} = \{S_1^{UE-1}, S_2^{UE-1}, \cdots, S_{N_{UE-1}}^{UE-1},$$
$$S_1^{UE-2}, S_2^{UE-2}, \cdots, S_{N_{UE-2}}^{UE-2}, \cdots, S_1^{UE-k1}, S_2^{UE-k1}, \cdots, S_{N_{UE-k1}}^{UE-k1}\}.$$

Similarly, CEIL(OF) groups of modulation symbols are spread into CEIL(OF) groups of sequences.

The network device maps an $i^{th}$ group of modulation symbols in the grouped modulation symbols to an $i^{th}$ row in the mapping matrix, where i is a natural number starting from 0 or a natural number starting from 1.

In a first example embodiment, that the network device maps the $i^{th}$ group of modulation symbols to the $i^{th}$ row in the mapping matrix may comply with the following rules. A second interval between locations, in the $i^{th}$ row, of any two adjacent modulation symbols in the $i^{th}$ group of modulation symbols is fixed. An attribute of the second interval is similar to that of the first interval, the second interval is relatively prime to the quantity of rows in the mapping matrix, and the second interval is relatively prime to the quantity of columns in the mapping matrix. In this way, repeated mapping of modulation symbols to one ME can be prevented. For example, PRS=12, and CEIL(OF)=2, that is, the quantity of rows in the mapping matrix is 2, and the quantity of columns in the mapping matrix is 12. In this case, optional values of the second interval include numbers that are relatively prime to both 2 and 12, such as 1, 5, 7, 11, 13, 17, and 19.

For a same row in the mapping matrix, the second interval is a fixed interval, and the network device maps the $i^{th}$ group of modulation symbols to the $i^{th}$ row in the mapping matrix one by one based on the second interval. If any two adjacent modulation symbols in the $i^{th}$ group of sequentially arranged modulation symbols are represented by a third modulation symbol and a fourth modulation symbol, the fourth modulation symbol is a next modulation symbol of the third modulation symbol. It may be understood that, starting from a location of the third modulation symbol in the $i^{th}$ row in the mapping matrix, after locations in the second interval are traversed in the $i^{th}$ row, a location to which the fourth modulation symbol should be mapped in the $i^{th}$ row is reached. If the last location in the $i^{th}$ row is traversed when the second interval is traversed, traversal continues to be performed cyclically from the first location in the $i^{th}$ row until the second interval is reached. The operations are performed until the $i^{th}$ group of modulation symbols are sequentially mapped to the $i^{th}$ row in the mapping matrix. For example, PRS=12, and the second interval P=5 is used when the $i^{th}$ group of modulation symbols are mapped to the $i^{th}$ row. In this case, a sequence of MEs to which the $i^{th}$ group of modulation symbols are mapped in the $i^{th}$ row is [1 6 11 4 9 2 7 12 5 10 3 8], and the sequence is represented by using a column number of the mapping matrix. A sequence of MEs to which a group of modulation symbols are mapped in a row may be determined by using a formula. First, an equally-spaced sequence $Sequence_p$=[1, 1+p, 1+2*p, ...] is generated, where p is the second interval. A modulo operation is performed on the equally-spaced sequence based on the PRS, to obtain a sequential sequence $Permutation_p$=mod ([1, 1+p, 1+2*p, ...]−1, PRS)+1 of MEs to which a group of modulation symbols are mapped in a row. The modulo operation can enable an RE sequence number represented by the sequence to satisfy a size of an RMB, so that a mapping range is within an RMB.

For different rows in the mapping matrix, the second interval has different values. That is, when different groups of modulation symbols are mapped to different rows, the used second interval has different values. For example, a first group of modulation symbols are mapped to a first row by using a second interval of 1, a second group of modulation symbols are mapped to a second row by using a second interval of 5, a third group of modulation symbols are mapped to a third row by using a second interval of 7, and so on.

Figure 8:
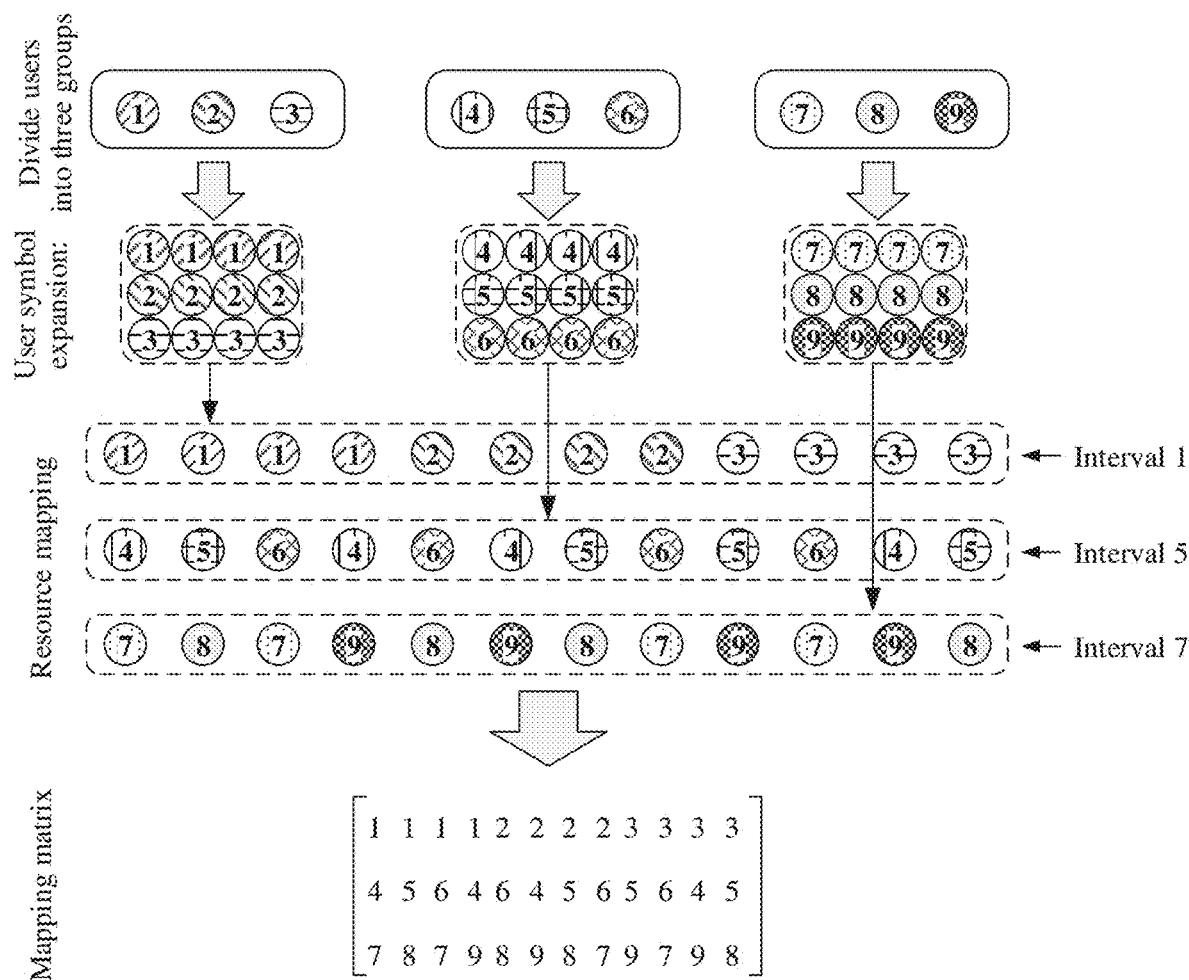
FIG. 8 is a schematic diagram of a group-based mapping mode based on an interval according to an embodiment of this application.

The first example embodiment is described in detail below by using an example. As shown in FIG. 8, a total quantity K of terminals mapped to one RMB is 9, and a total quantity $N_{UE-n}$ of modulation symbols mapped by each terminal to one RMB is 4. The nine terminals are represented by sequence numbers 1, 2, 3, 4, 5, 6, 7, 8, and 9. The nine terminals are grouped into three groups. A first group includes the terminals 1, 2, and 3, a second group includes the terminals 4, 5, and 6, and a third group includes the terminals 7, 8, and 9. The modulation symbols of the three groups of terminals are spread separately, where a first group of modulation symbols are {1 1 1 1 2 2 2 2 3 3 3 3}, a second group of modulation symbols are {4 4 4 4 5 5 5 5 6 6 6 6}, and a third group of modulation symbols are {7 7 7 7 8 8 8 9 9 9 9}. 1 represents a modulation symbol of the terminal 1, 2 represents a modulation symbol of the terminal 2, 3 represents a modulation symbol of the terminal 3, and so on.

The first group of modulation symbols are mapped to the first row in the mapping matrix at an interval of 1, the second group of modulation symbols are mapped to the second row in the mapping matrix at an interval of 5, and the third group of modulation symbols are mapped to the third row in the mapping matrix at an interval of 7. In this case, the first row is [1 1 1 1 2 2 2 2 3 3 3 3], the second row is [4 5 6 4 6 4 5 6 5 6 4 5], and the third row is [7 8 7 9 8 9 8 7 9 7 9 8]. Using the second row as an example, the first modulation symbol (4) in the second group of modulation symbols is mapped to the first location, and based on the interval of 5, the second modulation symbol (4) in the second group of modulation symbols is mapped to the sixth location, and the third modulation symbol (4) in the second group of modulation symbols is mapped to the eleventh location. Because there are only 12 mapping locations in one row, traversal may be performed cyclically from the first location. Therefore, after the $12^{th}$ location is traversed and after four locations are traversed cyclically from the first location, the fourth modulation symbol (4) in the second group of modulation symbols is mapped to the fourth location. In this way, mapping of the four modulation symbols of the terminal 4 is completed. The fifth modulation symbol (5) in the second group of modulation symbols is mapped at an interval of five locations after the fourth modulation symbol (4) of the second group of modulation symbols, then the sixth modulation symbol (5) in the second group of modulation symbols is mapped at the interval of 5, and so on.

According to the foregoing method, a mapping matrix $$\begin{bmatrix} 1 & 1 & 1 & 1 & 2 & 2 & 2 & 2 & 3 & 3 & 3 & 3 \\ 4 & 5 & 6 & 4 & 6 & 4 & 5 & 6 & 5 & 6 & 4 & 5 \\ 7 & 8 & 7 & 9 & 8 & 9 & 8 & 7 & 9 & 7 & 9 & 8 \end{bmatrix}$$

may be finally obtained by using the example shown in FIG. 8.

In a second example embodiment, the network device maps the $i^{th}$ group of modulation symbols to the $i^{th}$ row in the mapping matrix based on a cyclic shift value. Specifically, the network device may first sequentially map the $i^{th}$ group of modulation symbols to the $i^{th}$ row in the mapping matrix in an original order of the modulation symbols, and then perform cyclic shift on the modulation symbols in the $i^{th}$ row based on the cyclic shift value. Any two groups of modulation symbols are mapped to the mapping matrix based on different cyclic shift values. For example, PRS=8, sequence numbers of REs in an RMB are represented by using 1 to 8, and a mapping sequence from modulation symbols to the REs may be represented by using a sequence. In this case, the network device may first sequentially map each group of modulation symbols to a corresponding row in sequence of [1, 2, 3, 4, 5, 6, 7, 8]. If a cyclic shift value for a first group of modulation symbols is Δ=0, the network device performs cyclic shift on modulation symbols in the first row based on Δ=0, that is, based actually on an original sequence. If a cyclic shift value for a second group of modulation symbols is Δ=3, the network device performs cyclic shift on modulation symbols in the second row based on Δ=3, and a mapping sequence from the second group of modulation symbols to REs is [4 5 6 7 8 1 2 3]. To be specific, in the second group of modulation symbols, the first modulation symbol is mapped to the fourth RE, the second modulation symbol is mapped to the fifth RE, and the third to the eighth modulation symbols are sequentially mapped to the sixth, the seventh, the eighth, the first, the second, and the third REs. If a cyclic shift value for a third group of modulation symbols is Δ=−3, the network device performs cyclic shift on modulation symbols in a third row based on Δ=−3, and a sequence for a mapping sequence from the third group of modulation symbols to REs is [6 7 8 1 2 3 4 5]. To be specific, in the third group of modulation symbols, the first modulation symbol is mapped to the sixth RE, the second modulation symbol is mapped to the seventh RE, and the third to the eighth modulation symbols are sequentially mapped to the eighth, and first, the second, the third, the fourth, and the fifth REs.

The mapping locations of all the modulation symbols in the mapping matrix are determined according to the foregoing method, to obtain the mapping matrix.

When CEIL(OF)=2, a third example embodiment may be further used.

In the third example embodiment, the network device obtains two groups of modulation symbols. The network device interleaves an $i^{th}$ group of modulation symbols by using an interleaver, and maps the $i^{th}$ group of modulation symbols to an $i^{th}$ row in a mapping matrix, where i is 0 or 1, or i is 1 or 2. A size of the interleaver may be determined by a quantity of users (or a quantity of terminals) of a group of modulation symbols. For example, a quantity of rows of the interleaver is a quantity of users in a group, and a quantity of columns of the interleaver is a quantity of modulation symbols mapped by one user to one RMB. Specifically, the network device inputs one group of modulation symbols into the interleaver by row, reads the group of modulation symbols from the interleaver by row, and maps the modulation symbols read from the interleaver to one row in a mapping matrix. The network device inputs the other group of modulation symbols into the interleaver by row, reads the other group of modulation symbols from the interleaver by column, and maps the modulation symbols read from the interleaver to another row in the mapping matrix.

The mapping locations of all the modulation symbols in the mapping matrix are determined based on the foregoing row-column interleaving manner, to obtain the mapping matrix.

Figure 9:
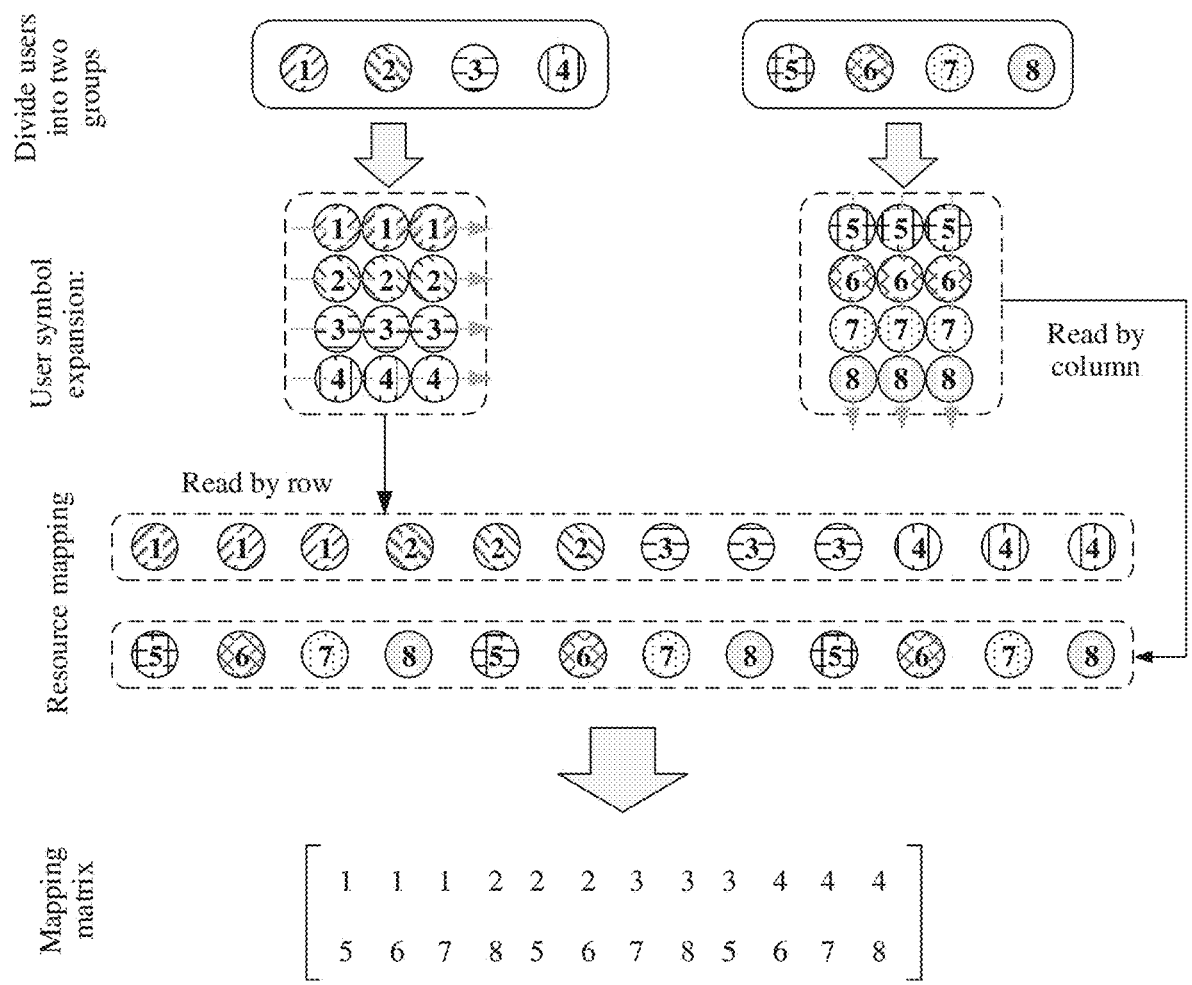
FIG. 9 is a schematic diagram of a group-based mapping mode based on row-column interleaving according to an embodiment of this application.

For example, as shown in FIG. 9, K=8, and eight terminals are divided into two groups. One group includes terminals 1, 2, 3, and 4, and the other group includes terminals 5, 6, 7, and 8. Modulation symbols of the two groups of terminals are spread separately, where a first group of modulation symbols are {1 1 1 2 2 2 3 3 3 4 4 4}, and a second group of modulation symbols are {5 5 5 6 6 6 7 7 7 8 8 8}. The two groups of modulation symbols shown in FIG. 9 are interleaved by using an interleaver with a size of four rows and three columns. The first group of modulation symbols {1 1 1 2 2 2 3 3 3 4 4 4} are input to the interleaver by row, read by row, and mapped to the first row in the mapping matrix as {1 1 1 2 2 2 3 3 3 4 4 4}. The second group of modulation symbols {5 5 5 6 6 6 7 7 7 8 8 8} are input to the interleaver by row, read by column, and mapped to the second row in the mapping matrix as {5 6 7 8 5 6 7 8 5 6 7 8}. In this manner, mapping locations of the two groups of modulation symbols in the mapping matrix are determined, and the obtained mapping matrix is $$\begin{bmatrix} 1 & 1 & 1 & 2 & 2 & 2 & 3 & 3 & 3 & 4 & 4 & 4 \\ 5 & 6 & 7 & 8 & 5 & 6 & 7 & 8 & 5 & 6 & 7 & 8 \end{bmatrix}.$$

In a fourth example embodiment, the network device may map the modulation symbols to the mapping matrix by combining any two or more of the first to the third example embodiments. Specifically, the modulation symbols are first mapped to the mapping matrix in one of the example embodiments, to obtain a mapping result, and then the mapping result is adjusted according to another example embodiment. For example, the $i^{th}$ group of modulation symbols are first mapped to the $i^{th}$ row in the mapping matrix based on the second interval, and then cyclic shift is performed on the modulation symbols in the $i^{th}$ row based on a cyclic shift value.

That the network device may obtain the mapping matrix in the foregoing manner 1 and manner 2 is described above. In the present disclosure, the network device may dynamically obtain the mapping matrix in the manner 1 or the manner 2, and send, to the terminal, information indicating the mapping matrix. Alternatively, the network device pre-stores the mapping matrix obtained in the manner 1 and the manner 2, and sends, to the terminal, the information indicating the mapping matrix; or pre-negotiates with the terminal about the mapping matrix. Both the terminal side and the network device side obtain the mapping matrix in the foregoing manner that is pre-stored.

In addition to the manner 1 and the manner 2, the network device may alternatively obtain the mapping matrix in a manner 3. In the manner 3, some fixed mapping matrices are provided. The network device and the terminal may pre-store the fixed mapping matrices, or the network device schedules the fixed mapping matrices by using signaling. If PRS=12, some examples of the fixed mapping matrices are provided as follows:

$$\begin{bmatrix} 1 & 1 & 2 & 2 & 3 & 3 & 4 & 4 & 5 & 5 & 6 & 6 \\ 7 & 9 & 11 & 8 & 12 & 7 & 10 & 11 & 9 & 12 & 8 & 10 \end{bmatrix}; \quad (1)$$

$$\begin{bmatrix} 1 & 1 & 1 & 2 & 2 & 2 & 3 & 3 & 3 & 4 & 4 & 4 \\ 5 & 6 & 7 & 6 & 7 & 8 & 8 & 5 & 6 & 7 & 8 & 5 \end{bmatrix}; \quad (2)$$

$$\begin{bmatrix} 1 & 1 & 1 & 1 & 2 & 2 & 2 & 2 & 3 & 3 & 3 & 3 \\ 4 & 5 & 6 & 4 & 6 & 4 & 5 & 6 & 5 & 6 & 4 & 5 \end{bmatrix}; \quad (3)$$

$$\begin{bmatrix} 1 & 1 & 1 & 1 & 2 & 2 & 2 & 2 & 3 & 3 & 3 & 3 \\ 4 & 5 & 6 & 4 & 4 & 5 & 6 & 5 & 4 & 5 & 6 & 6 \\ 7 & 8 & 9 & 7 & 8 & 7 & 8 & 9 & 9 & 9 & 7 & 8 \end{bmatrix}; \text{ and} \quad (4)$$

$$\begin{bmatrix} 1 & 1 & 1 & 1 & 1 & 1 & 2 & 2 & 2 & 2 & 2 & 2 \\ 3 & 3 & 3 & 4 & 4 & 4 & 3 & 3 & 3 & 4 & 4 & 4 \\ 5 & 5 & 6 & 6 & 5 & 5 & 5 & 6 & 6 & 5 & 5 & 6 & 6 \\ 7 & 8 & 7 & 8 & 7 & 8 & 7 & 8 & 7 & 8 & 7 & 8 \end{bmatrix}. \quad (5)$$

In the mapping matrix (1), 12 users are mapped to 12 REs, and each user may map two modulation symbols. That is, a maximum mapping ratio is 2/12=1/6, MRS=24, and two modulation symbols may be mapped to one RE.

In the mapping matrix (2), eight users are mapped to 12 REs, and each user may map three modulation symbols. That is, a maximum mapping ratio is 3/12=1/4, MRS=24, and two modulation symbols may be mapped to one RE.

In the mapping matrix (3), six users are mapped to 12 REs, and each user may map four modulation symbols. That is, a maximum mapping ratio is 4/12=1/3, MRS=24, and two modulation symbols may be mapped to one RE.

In the mapping matrix (4), nine users are mapped to 12 REs, and each user may map four modulation symbols. That is, a maximum mapping ratio is 4/12=1/3, MRS=36, and three modulation symbols may be mapped to one RE.

In the mapping matrix (5), eight users are mapped to 12 REs, and each user may map six modulation symbols. That is, a maximum mapping ratio is 6/12=1/2, MRS=48, and four modulation symbols may be mapped to one RE.

If a quantity of actually scheduled or accessed users is less than a quantity of users who can be carried in the mapping matrix, mapping locations for a corresponding quantity of users may be set to null in the mapping matrix. For example, if the mapping matrix (2) is used, eight users may be carried, and seven users are actually scheduled, a mapping location for a user with any sequence number may be set to null in the mapping matrix. For example, a mapping location for a user whose sequence number is 8 is set to null, and a mapping matrix is $$\begin{bmatrix} 1 & 1 & 1 & 2 & 2 & 2 & 3 & 3 & 3 & 4 & 4 & 4 \\ 5 & 6 & 7 & 6 & 7 & X & X & 5 & 6 & 7 & X & 5 \end{bmatrix}.$$

Alternatively, a mapping location for a user whose sequence number is 7 may be set to null, a mapping matrix is $$\begin{bmatrix} 1 & 1 & 1 & 2 & 2 & 2 & 3 & 3 & 3 & 4 & 4 & 4 \\ 5 & 6 & X & 6 & X & 8 & 8 & 5 & 6 & X & 8 & 5 \end{bmatrix},$$

and a user 8 occupies a location whose sequence number is 8 in the matrix. X indicates that no modulation symbol is mapped to the location, that is, the location is null.

In the foregoing fixed mapping matrices, the network device may schedule mapping ratios of all access terminals to a same value according to a system load, that is, schedule all the access terminals to map a same modulation symbol to one RMB. Specifically, the mapping ratios may be broadcast to all the terminals by using signaling. If actual transmit power of users is different, the transmit power can be allocated to each modulation symbol. In this way, a scheduling procedure of the network device is simple and easy to implement.

If the network device schedules different mapping ratios for different users, in a manner, the network device may select a mapping matrix with a largest mapping ratio based on a user with a largest mapping ratio, and based on a mapping location of a user with a relatively small mapping ratio in the mapping matrix with the largest mapping ratio, extract a subset from the mapping matrix with the largest mapping ratio, and reserve some null bits as a finally determined mapping matrix used to schedule these users. For example, the mapping matrix (2) may carry eight users, and a quantity of actually scheduled users may not be greater than 8. If eight users are actually scheduled, three modulation symbols are mapped to each of a user 1, a user 2, and a user 3, two modulation symbols are mapped to each of a user 4, a user 5, and a user 6, and one modulation symbol is mapped to each of the user 7 and the user 8. In this case, a subset is extracted from the mapping matrix (2). Specifically, three mapping locations are selected from mapping locations of the user 1, the user 2, and the user 3, two mapping locations are selected from mapping locations of the user 4, the user 5, and the user 6, one mapping location is selected from mapping locations of the user 7 and the user 8, and other unselected locations are set to null. In this way, a mapping matrix $$\begin{bmatrix} 1 & 1 & 1 & 2 & 2 & 2 & 3 & 3 & 3 & 4 & 4 & X \\ 5 & 6 & 7 & 6 & X & 8 & X & 5 & X & X & X & X \end{bmatrix}$$

is finally generated, where X indicates that no modulation symbol is mapped to the location, that is, the location is set to null. For another example, the mapping matrix (2) may carry eight users. If five users are actually scheduled, three modulation symbols are mapped to a user 1, two modulation symbols are mapped to each of a user 2 and a user 3, and one modulation symbol is mapped to each of a user 4 and a user 5, the mapping matrix (2) is transformed into a final mapping matrix $$\begin{bmatrix} 1 & 1 & 1 & 2 & 2 & X & 3 & 3 & X & 4 & X & X \\ 5 & X & X & X & X & X & X & X & X & X & X & X \end{bmatrix},$$

where X indicates that no modulation symbol is mapped to the location, that is, the location is set to null. For another example, the mapping matrix (3) may carry six users, and a quantity of actually scheduled users may not be greater than 6. If five users are actually scheduled, four modulation symbols are mapped to each of a user 1, a user 2, and a user 3, and three modulation symbols are mapped to each of a user 4 and a user 5, a subset is extracted from the mapping matrix (3). Specifically, four mapping locations are selected from mapping locations of the users 1, 2, and 3, three mapping locations are selected from mapping locations of the user 4 and the user 5, and unselected mapping locations are set to null. In this case, the mapping matrix (3) is transformed into a final mapping matrix $$\begin{bmatrix} 1 & 1 & 1 & 1 & 2 & 2 & 2 & 2 & 3 & 3 & 3 & 3 \\ 4 & 5 & 6 & 4 & X & 4 & 5 & X & 5 & X & X & X \end{bmatrix}.$$

If the network device schedules different mapping ratios for different users, in another manner, the network device selects a mapping matrix based on a user whose mapping ratio is not the largest, where the mapping matrix is denoted as a basic mapping matrix. A mapping ratio of the basic mapping matrix is R. If a mapping ratio of a user is Y times R, the user occupies mapping locations of Y users in the basic mapping matrix. For example, the mapping matrix (2) may carry eight users, and a quantity of actually scheduled users may not be greater than 8. If five users are actually scheduled, mapping ratios of the user 1 and the user 2 are both 1/4, and three modulation symbols are mapped, the user 1 and the user 2 still occupy mapping locations of the user 1 and the user 2 in the basic mapping matrix. If mapping ratios of a user 3, a user 4, and a user 5 are all 1/2, the user 3, the user 4, and the user 5 each occupy mapping locations of two users in the basic mapping matrix. For example, the user 3 occupies mapping locations of users whose sequence numbers are 3 and 4 in the basic mapping matrix, the user 4 occupies mapping locations of users whose sequence numbers are 5 and 6 in the basic mapping matrix, and the user 5 occupies mapping locations of users whose sequence numbers are 7 and 8 in the basic mapping matrix. In this case, the mapping matrix (2) is transformed into a final mapping matrix $$\begin{bmatrix} 1 & 1 & 1 & 2 & 2 & 2 & 3 & 3 & 3 & 3 & 3 & 3 \\ 4 & 4 & 5 & 4 & 5 & 5 & 5 & 4 & 4 & 5 & 5 & 4 \end{bmatrix}.$$

The foregoing two manners may alternatively be combined. If the network device schedules different mapping ratios for different users, in still another manner, the network device selects a mapping matrix based on a user whose mapping ratio is not the largest, where the mapping matrix is denoted as a basic mapping matrix. A mapping ratio of the basic mapping matrix is R. If a mapping ratio of a user is Y times R, the user occupies mapping locations of Y users in the basic mapping matrix. If a mapping ratio of a user is less than R, some mapping locations of the user in the basic mapping matrix are set to null. For example, the mapping matrix (2) may carry eight users, and a quantity of actually scheduled users may not be greater than 8. If five users are actually scheduled, mapping ratios of a user 1 and a user 2 are both 1/6, and two modulation symbols are mapped, the user 1 and the user 2 occupy two locations in mapping locations of the user 1 and the user 2 in the basic mapping matrix, and other locations are set to null. If mapping ratios of the user 3, the user 4, and the user 5 are all 1/2, the user 3, the user 4, and the user 5 each occupy mapping locations of two users in the basic mapping matrix. For example, the user 3 occupies mapping locations of users whose sequence numbers are 3 and 4 in the basic mapping matrix, the user 4 occupies mapping locations of users whose sequence numbers are 5 and 6 in the basic mapping matrix, and the user 5 occupies mapping locations of users whose sequence numbers are 7 and 8 in the basic mapping matrix. In this case, the mapping matrix (2) is transformed into a final mapping matrix $$\begin{bmatrix} 1 & 1 & X & 2 & 2 & X & 3 & 3 & 3 & 3 & 3 & 3 \\ 4 & 4 & 5 & 4 & 5 & 5 & 5 & 4 & 4 & 5 & 5 & 4 \end{bmatrix},$$

where X indicates that no modulation symbol is mapped to the location, that is, the location is set to null.

If the network device schedules different mapping ratios for different users, in yet another manner, the network device combines a plurality of basic mapping matrices to obtain a final mapping matrix. A plurality of basic mapping matrices should have same PRS and MRSs. For example, five users are actually scheduled, mapping ratios of three users (a user 1 to a user 3) are 1/3, and mapping ratios of the other two users (a user 4 and a user 5) are 1/4. In this case, original mapping positions of the user 1 to the user 3 are selected from the mapping matrix (3) as mapping locations of the user 1 to the user 3, and original mapping locations of the user 5 and the user 6 are selected from the mapping matrix (2) as mapping locations of the user 4 and the user 5. A combined mapping matrix is $$\begin{bmatrix} 1 & 1 & 1 & 1 & 2 & 2 & 2 & 2 & 3 & 3 & 3 & 3 \\ 5 & 6 & X & 6 & X & X & X & 5 & 6 & X & X & 5 \end{bmatrix},$$

where X indicates that no modulation symbol is mapped to the location, that is, the location is set to null.

Equivalent transformation may also be performed on the foregoing fixed mapping matrices, to obtain some equivalent matrices that may also be applied to the present disclosure. For example, row transformation is performed, and a mapping matrix $$\begin{bmatrix} 7 & 9 & 11 & 8 & 12 & 7 & 10 & 11 & 9 & 12 & 8 & 10 \\ 1 & 1 & 2 & 2 & 3 & 3 & 4 & 4 & 5 & 5 & 6 & 6 \end{bmatrix}$$

is obtained after row transformation is performed on the mapping matrix (1). In the mapping matrix (5), the first row and the third row are interchanged, and the second row and the fourth row are interchanged, to obtain a mapping matrix $$\begin{bmatrix} 5 & 5 & 6 & 6 & 5 & 5 & 6 & 6 & 5 & 5 & 6 & 6 \\ 7 & 8 & 7 & 8 & 7 & 8 & 7 & 8 & 7 & 8 & 7 & 8 \\ 1 & 1 & 1 & 1 & 1 & 1 & 2 & 2 & 2 & 2 & 2 & 2 \\ 3 & 3 & 3 & 4 & 4 & 4 & 3 & 3 & 3 & 4 & 4 & 4 \end{bmatrix}.$$

Equivalent transformation may also be performed on other mapping matrices, and examples are not listed one by one herein.

In the foregoing solutions, a location that is set to null may be randomly selected from a plurality of mapping locations occupied by one user.

In the foregoing fixed mapping matrices, for an MRB including 12 REs, modulation symbols mapped to the REs relatively evenly collide. For example, in the mapping matrix (4), nine users are mapped to 12 REs, and each user may map four modulation symbols, that is, a maximum mapping ratio is 4/12=1/3, and three modulation symbols may be mapped to one RE. If a manner in the current technology is used, an obtained mapping pattern may be $$\begin{bmatrix} 1 & 1 & 1 & 1 & 2 & 2 & 2 & 2 & 3 & 3 & 3 & 3 \\ 4 & 4 & 4 & 4 & 5 & 5 & 5 & 5 & 6 & 6 & 6 & 6 \\ 7 & 7 & 7 & 7 & 8 & 8 & 8 & 8 & 9 & 9 & 9 & 9 \end{bmatrix}.$$

In this case, collisions among users 1, 4, and 7 are relatively more likely to happen, collisions among users 3, 6, and 9 are relatively more likely to happen, and collisions among users 2, 5, and 8 are relatively more likely to happen, which may cause a demodulation failure at a receive end, and affect a system capacity and a user bit error rate. However, in the mapping matrix (4) provided in the present disclosure, the user 1 collides with each of the user 4, the user 5, the user 6, the user 7, the user 8, and the user 9. Similarly, the user 2 collides with each of the user 4, the user 5, the user 6, the user 7, the user 8, and the user 9. Interference of other users is similar and is relatively even. For the receive end, demodulation is performed per user. In the mapping matrix (4), collisions between a user and other UEs are relatively even, which facilitates demodulation of the receiver. In conclusion, according to the foregoing fixed mapping matrices provided in the present disclosure, modulation symbols of users can evenly collide, so that the mapping mode can be better combined with an MUD algorithm, a channel decoding algorithm, and an IC algorithm, thereby improving a system capacity and user bit error rate performance.

According to the foregoing manner 1, manner 2, and manner 3 of obtaining the mapping matrix, if the network device pre-negotiates with the terminal about a mapping matrix, both the terminal side and the network device side use the pre-stored mapping matrix. Alternatively, the network device indicates, to the terminal by using signaling, the information indicating the mapping matrix. The information indicating the mapping matrix may include any one or a combination of the following: the mapping matrix, a quantity of REs included in the RMB, a quantity of elements included in the mapping matrix, the average quantity of modulation symbols carried on one RE, a group number of the terminal, all mapping locations (for example, RE sequence numbers) of the terminal in the RMB, a mapping start location (for example, an RE sequence number, a row number or a sequence number in the mapping matrix, or $c_{UE-n}$) of the terminal in the RMB, a quantity of modulation symbols mapped by the terminal to the RMB, a mapping ratio MR of the terminal, the first interval, and the second interval.

That is all about the mapping mode of the mapping matrix.

2. Mapping Mode of the Mapping Formula

The mapping locations of the plurality of modulation symbols in the RMB may be calculated by using a mapping formula.

Specifically, when N=0, 1, 2, . . . , and N is a natural number, a mapping location, in the RMB, of an $N^{th}$ modulation symbol in the plurality of modulation symbols is $$r = \mod\left(\left\lceil \frac{\text{Sequence}_p(N)}{\text{CEIL}(OF)} \right\rceil, PRS\right).$$

When N=1, 2, . . . , and N is a positive integer, a mapping location, in the RMB, of an $N^{th}$ modulation symbol in the plurality of modulation symbols is $$r = \mod\left(\left\lceil \frac{\text{Sequence}_p(N)}{\text{CEIL}(OF)} \right\rceil - 1, PRS\right) + 1.$$

r represents a sequence number of an RE in the RMB, OF represents an average quantity of modulation symbols carried on one RE, CEIL(OF) represents rounding up OF, mod represents a modulo operation, PRS represents a maximum quantity of modulation symbols carried on the RMB, $\text{Sequence}_p=[c, c+p, c+2*p, \ldots, c+PRS*p]$, c is a constant, p is a fourth interval, $\text{Sequence}_p(N)$ is a value, in the sequence, corresponding to the $N^{th}$ symbol in the plurality of modulation symbols, and $\text{Sequence}_p(N)=c+(N-1)\times p$.

In the mapping mode of the mapping matrix, that the network device maps the plurality of sequentially arranged modulation symbols to the mapping matrix at the first interval is described. The method may be implemented through calculation by using a formula.

Specifically, there are K terminals that are to send modulation symbols. After being sorted, the K terminals are represented by UE-1, UE-2, . . . , and UE-K. The modulation symbols of the plurality of sorted terminals are spread to obtain a plurality of sequentially arranged modulation symbols. For example, the terminal UE-n is a terminal whose sequence number is n, where n=1, 2, . . . , K. $N_{UE-n}$ to-be-sent modulation symbols of the terminal UE-n are spread into a sequence $$\text{Symbol}_{UE-n} = \left\{ S_1^{UE-n}, S_2^{UE-n}, \ldots, S_{N_{UE-n}}^{UE-n} \right\},$$

and modulation symbols of each of the K sorted terminals are spread to obtain a sequence $$\text{Symbol}_{All} = \left\{ S_1^{UE-1}, S_2^{UE-1}, \ldots, S_{N_{UE-1}}^{UE-1}, S_1^{UE-2}, \right.$$
$$\left. S_2^{UE-2}, \ldots, S_{N_{UE-2}}^{UE-2}, \ldots, S_1^{UE-K}, S_2^{UE-K}, \ldots, S_{N_{UE-K}}^{UE-K} \right\}$$

of all modulation symbols of the K terminals. The network device obtains an equally-spaced sequence $\text{Sequence}_p=[c, c+p, c+2*p, \ldots, c+PRS*p]$, where c is a constant, p is the first interval, a value, in the equally-spaced sequence, corresponding to an $N^{th}$ modulation symbol in $\text{Symbol}_{All}$ is $\text{Sequence}_p(N)$, and $\text{Sequence}_p(N)=c+(N-1)\times p$.

When N=0, 1, 2, . . . , and N is a natural number:

The network device determines a column number of the $N^{th}$ modulation symbol in the mapping matrix according to a formula (1), and determines a row number of the $N^{th}$ modulation symbol in the mapping matrix according to a formula (2):

$$\text{Column}(N) = \mod\left(\left\lceil \frac{\text{Sequence}_p(N)}{\text{CEIL}(OF)} \right\rceil, PRS\right) \quad \text{Formula (1)}$$

$$\text{Row}(N) = \mod(\text{Sequence}_p(N), \text{CEIL}(OF)) \quad \text{Formula (2)}$$

When N=1, 2, . . . , and N is an integer:

The network device determines a column number of the $N^{th}$ modulation symbol in the mapping matrix according to a formula (3), and determines a row number of the $N^{th}$ modulation symbol in the mapping matrix according to a formula (4):

$$\text{Column}(N) = \mod\left(\left\lceil \frac{\text{Sequence}_p(N)}{\text{CEIL}(OF)} \right\rceil - 1, PRS\right) + 1 \quad \text{Formula (3)}$$

$$\text{Row}(N) = \mod(\text{Sequence}_p(N) - 1, \text{CEIL}(OF)) + 1 \quad \text{Formula (4)}$$

mod represents a modulo operation. For explanations of other symbols, refer to the foregoing descriptions.

The mapping location of the $N^{th}$ modulation symbol in the mapping matrix is determined based on the column number and the row number of the $N^{th}$ modulation symbol in the mapping matrix.

3. Mapping Mode of the Circular Buffer

The mapping locations of the plurality of modulation symbols in the RMB may be determined by using a circular buffer. Specifically, the network device maps the plurality of modulation symbols to the circular buffer at a fixed interval, and determines the mapping locations of the plurality of modulation symbols in the RMB based on locations of the plurality of modulation symbols in the circular buffer.

Figure 7:
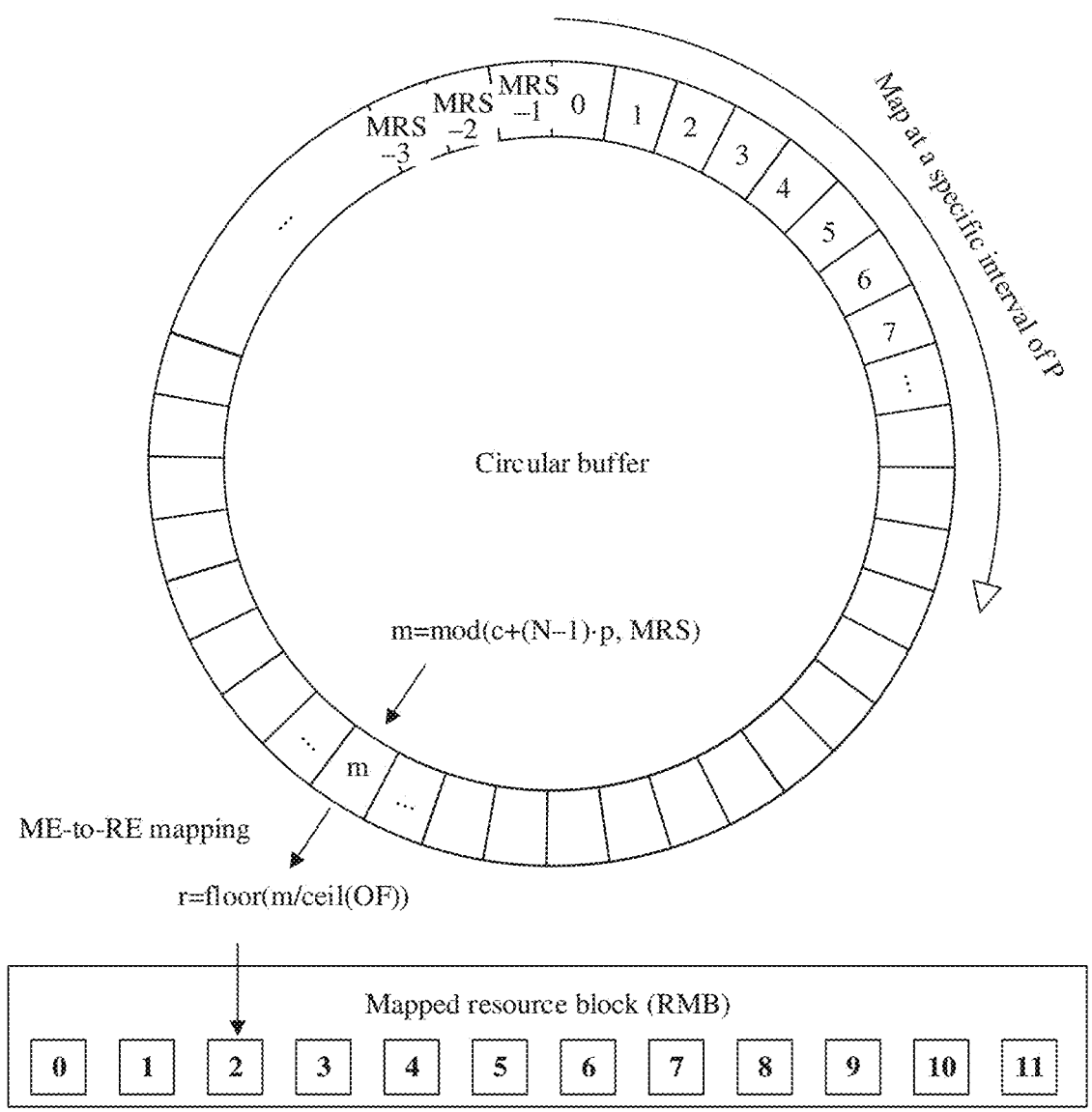
FIG. 7 is a schematic diagram of a mapping mode based on a circular buffer according to an embodiment of this application.

Specifically, as shown in FIG. 7, a circular buffer for mapping a plurality of modulation symbols is defined, and a circumference of the circular buffer is determined based on a quantity of REs included in the RMB and a quantity of modulation symbols carried on one of the REs. For example, the circumference of the circular buffer may be MRS=PRS×CEIL(OF), that is, a total quantity of elements in the mapping matrix. One element in the circular buffer represents a mappable location, that is, represents one ME, and one modulation symbol may be mapped to one element. The circular buffer may be used to cyclically map modulation symbols.

A location m, in the circular buffer, of an $N^{th}$ modulation symbol in the plurality of modulation symbols is mod (Sequence$_p$(N), MRS), and a mapping location r of the $N^{th}$ modulation symbol in the RMB is floor(m/ceil(OF)), where mod represents a modulo operation, floor represents rounding down, the sequence Sequence$_p$=[c, c+p, c+2*p, ... c+PRS*p], c is a constant, p is the fixed interval and may be denoted as a third interval, Sequence$_p$(N) is a value, in the sequence, corresponding to the $N^{th}$ symbol in the plurality of modulation symbols, Sequence$_p$(N)=c+(N−1)×p, and N=1, 2 ....

An attribute of the third interval is similar to that of the first interval in the foregoing descriptions. The third interval is relatively prime to the quantity of modulation symbols carried on one RE, and is relatively prime to the quantity of REs included in the RMB.

In the mapping mode of the mapping matrix, that the network device maps the plurality of sequentially arranged modulation symbols to the mapping matrix at the first interval is described. The method may be implemented by the circular buffer.

Specifically, there are K terminals that are to send modulation symbols. After being sorted, the K terminals are represented by UE-1, UE-2, . . . , and UE-K. The modulation symbols of the plurality of sorted terminals are spread to obtain a plurality of sequentially arranged modulation symbols. For example, the terminal UE-n is a terminal whose sequence number is n, where n=1, 2, . . . , K. If $N_{UE-n}$ to-be-sent modulation symbols of a terminal UE-n are spread into a sequence $$Symbol_{UE-n} = \{S_1^{UE-n}, S_2^{UE-n}, \ldots, S_{N_{UE-n}}^{UE-n}\},$$

modulation symbols of each of the K sorted terminals are spread, to obtain a sequence $$Symbol_{All} = \{S_1^{UE-1}, S_2^{UE-1}, \ldots, S_{N_{UE-1}}^{UE-1}, S_1^{UE-2},$$
$$S_2^{UE-2}, \ldots, S_{N_{UE-2}}^{UE-2}, \ldots, S_1^{UE-K}, S_2^{UE-K}, \ldots, S_{N_{UE-K}}^{UE-K}\}$$

of all modulation symbols of the K terminals.

The network device obtains an equally-spaced sequence Sequence$_p$[c, c+p, c+2*p, . . . , c+PRS*p], where c is a constant, p is the first interval, a value, in the equally-spaced sequence, corresponding to an $N^{th}$ modulation symbol in Symbol$_{All}$ is Sequence$_p$(N), Sequence$_p$(N)=c+(N−1)×p, and N is a positive integer. A mapping location of the $N^{th}$ modulation symbol in the circular buffer is m=mod(Sequence$_p$(N), MRS), that is, m=mod(c+(N−1)×p, MRS), where mod represents a modulo operation. The mapping location of the $N^{th}$ modulation symbol in the RMB is determined based on the mapping location m of the $N^{th}$ modulation symbol in the circular buffer. Specifically, the mapping location of the $N^{th}$ modulation symbol in the RMB is r=floor(m/ceil(OF)), where a value of r may represent a sequence number of an RE in the RMB, and floor represents rounding down.

Both the manner of calculation by using a formula and the manner of cyclic buffering may be implemented by a circuit.

In the foregoing several mapping modes, a load of the receiver can be relatively properly allocated to an MUD or a channel decoder, thereby helping reduce complexity of the receiver, and improving application effects of the resource mapping method in an MUD algorithm, a channel decoding algorithm, and an IC algorithm. The following provides some examples of the mapping matrix. The following examples may be obtained by using any one of the foregoing mapping modes, or may be obtained in any other manners. In the following examples, a load factor is used to indicate a ratio of a quantity of modulation symbols actually carried on an MB to a maximum quantity of modulation symbols that can be carried on the MB. The quantity of symbols is used to indicate a quantity of modulation symbols mapped by one terminal to one RMB, and an interval P is a value of the first interval. No modulation symbol is mapped to a location of X in the mapping matrix, that is, the location is set to null.

Table 1 is an example in which one RMB carries four users.

TABLE 1

| Load factor | PRS | Quantity of symbols | Interval p | Mapping matrix |
|---|---|---|---|---|
| 1 | 8 | 2 | 5 | 1 3 2 4 3 1 4 2 |
| 1.33 | 12 | 4 | 7 | 1 4 2 X 3 X 4 1 X 2 X 3 2 X 3 1 4 2 X 3 X 4 1 X |
| 1.5 | 8 | 3 | 5 | 1 4 2 X 3 1 X 3 X 3 1 4 2 X 4 2 |
| 2 | 8 | 4 | 7 | 1 4 4 3 3 2 2 1 2 2 1 1 4 4 3 3 |
| 2.5 | 8 | 5 | 5 | 1 4 2 X 3 1 4 2 2 X 3 1 4 2 X 3 3 1 4 2 X 3 1 4 |
| 3 | 8 | 6 | 7 | 1 4 4 3 3 2 2 1 2 1 1 4 4 3 3 2 3 2 2 1 1 4 4 3 |
| 3.5 | 8 | 7 | 5 | 1 3 2 X 3 1 4 2 2 1 4 2 X 3 1 4 4 3 1 4 2 X 3 1 2 4 3 1 4 2 X 3 |
| 4 | 8 | 8 | 5 | 1 3 2 4 3 1 4 2 2 1 3 2 4 3 1 4 4 2 1 3 2 4 3 1 1 4 2 1 3 2 4 3 |

Table 2 is an example in which one RMB carries six users.

TABLE 2

| Load factor | PRS | Quantity of symbols | Interval p | Mapping matrix |
|---|---|---|---|---|
| 1 | 12 | 2 | 5 | 1 3 6 2 5 1 4 6 3 5 2 4 |
| 1.5 | 12 | 3 | 5 | 1 4 X 3 6 1 5 X 3 X 2 5 2 6 1 4 X 3 6 2 5 X 4 X |
| 2 | 12 | 4 | 7 | 1 4 2 5 3 6 4 1 5 2 6 3 2 6 3 1 4 2 5 3 6 4 1 5 |
| 2.5 | 12 | 5 | 5 | 1 4 X 2 5 1 4 X 3 6 2 5 6 2 5 1 4 X 3 6 2 5 X 3 5 1 4 X 3 6 1 4 X 3 6 2 |
| 3 | 12 | 6 | 5 | 1 3 6 2 5 1 4 6 3 5 2 4 5 2 4 1 3 6 2 5 1 4 6 3 4 1 3 6 2 5 1 4 6 3 5 2 |

TABLE 2-continued

| Load factor | PRS | Quantity of symbols | Interval p | Mapping matrix |
|---|---|---|---|---|
| 3.5 | 12 | 7 | 5 | 1 3 6 2 5 1 4 X 3 6 2 5<br>5 1 4 6 2 5 1 4 X 3 6 2<br>2 5 1 4 X 3 5 1 4 X 3 6<br>6 2 5 1 4 X 3 6 2 4 X 3 |
| 4 | 12 | 8 | 5 | 1 3 6 2 5 1 4 6 3 5 2 4<br>4 1 3 6 2 5 1 4 6 3 5 2<br>2 4 1 3 6 2 5 1 4 6 3 5<br>5 2 4 1 3 6 2 5 1 4 6 3 |

Table 3 is an example in which one RMB carries eight users.

TABLE 3

| Load factor | PRS | Quantity of symbols | Interval p | Mapping matrix |
|---|---|---|---|---|
| 1 | 8 | 1 | 5 | 1 6 3 8 5 2 7 4 |
| 1.33 | 12 | 2 | 7 | 1 8 3 X 5 7 2 X 4 X 6<br>4 X 6 1 8 3 X 5 7 2 X |
| 1.5 | 16 | 3 | 5 | 1 X 7 5 3 1 X 8 6 4 2 X X 7 5 3<br>5 3 1 X 8 6 4 2 X 8 6 4 2 X X 7 |
| 2 | 16 | 4 | 7 | 1 4 8 3 7 2 6 1 5 8 4 7 3 6 2 5<br>6 2 5 1 4 8 3 7 2 6 1 5 8 4 7 3 |
| 2.5 | 16 | 5 | 5 | 1 8 7 5 3 1 X 7 5 4 2 X 8 6 4 2<br>6 5 3 1 X 7 5 3 2 X 8 6 4 2 X 8<br>3 1 X 7 5 3 1 X 7 6 4 2 X 8 6 4 |
| 2.67 | 12 | 4 | 5 | 1 4 8 3 7 1 5 X 4 7 2 6<br>8 3 6 1 5 X 3 7 2 6 X 4<br>6 1 5 8 3 7 2 5 X 4 8 2 |
| 3 | 8 | 3 | 5 | 1 6 3 8 5 2 7 4<br>2 7 4 1 6 3 8 5<br>4 1 6 3 8 5 2 7 |
| 3.33 | 12 | 5 | 7 | 1 6 2 8 4 X 5 1 7 3 X 5<br>2 8 4 X 5 1 7 3 8 4 X 6<br>3 X 5 1 7 3 8 4 X 6 2 7<br>5 1 6 2 8 4 X 6 2 7 3 X |
| 4 | 8 | 4 | 7 | 1 8 7 6 5 4 3 2<br>6 5 4 3 2 1 8 7<br>4 3 2 1 8 7 6 5<br>2 1 8 7 6 5 4 3 |
| 4 | 12 | 6 | 5 | 1 4 7 3 6 1 5 8 3 7 2 5<br>5 1 4 7 3 6 1 5 8 3 7 2<br>2 6 1 4 8 3 6 2 5 8 4 7<br>7 2 6 1 4 8 3 6 2 5 8 4 |

Table 4 is an example in which one RMB carries 12 users.

TABLE 4

| Load factor | PRS | Quantity of symbols | Interval p | Mapping matrix |
|---|---|---|---|---|
| 1 | 12 | 1 | 5 | 1 6 11 4 9 2 7 12 5 10 3 8 |
| 1.5 | 24 | 3 | 5 | 1 4 7 11 X 1 5 8 11 X 2 5 9 12 X 3 6 9 X X 3 7 10 X<br>10 X 1 4 8 11 X 2 5 8 12 X 2 6 9 12 X 3 6 10 X X 4 7 |
| 2 | 12 | 2 | 5 | 1 6 11 4 9 2 7 12 5 10 3 8<br>3 8 1 6 11 4 9 2 7 12 5 10 |
| 2.5 | 24 | 5 | 11 | 1 7 X 6 X 5 11 4 10 2 9 1 8 X 7 X 5 12 4 11 3 10 2 8<br>12 5 11 3 10 2 9 1 8 X 6 X 5 12 4 11 3 9 2 8 X 7 X 6<br>10 2 9 1 7 X 6 X 5 12 4 10 3 9 1 8 X 7 X 6 12 4 11 3 |
| 3 | 12 | 3 | 5 | 1 6 11 4 9 2 7 12 5 10 3 8<br>10 3 8 1 6 11 4 9 2 7 12 5<br>8 1 6 11 4 9 2 7 12 5 10 3 |
| 3.5 | 24 | 7 | 17 | 1 10 6 2 12 8 4 X 10 6 2 11 7 3 X 9 5 1 11 7 3 X 9 5<br>3 X 9 5 1 10 6 2 12 8 4 X 10 6 2 12 8 4 X 9 5 1 11 7<br>5 1 11 7 3 X 9 5 1 11 7 3 12 8 4 X 10 6 2 12 8 4 X 9<br>8 4 X 10 6 2 11 7 3 X 9 5 1 11 7 3 12 8 4 X 10 6 2 12 |
| 4 | 12 | 4 | 7 | 1 8 3 10 5 12 7 2 9 4 11 6<br>2 9 4 11 6 1 8 3 10 5 12 7<br>4 11 6 1 8 3 10 5 12 7 2 9<br>6 1 8 3 10 5 12 7 2 9 4 11 |

The network device may schedule a terminal based on the mapping matrices in the foregoing tables, where PRS may be set to twice a quantity of users, the interval p may be determined by a parameter that enables system to multi-user interference (MUI) to be relatively small, both the load factor and the interval P may be determined by the quantity of modulation symbols, and CEIL(OF) may be obtained by rounding up the load factor. In an actual application, a correspondence among the foregoing parameters is shown in Table 5.

TABLE 5

| Quantity of users | | 4 | | 6 | | 8 | | 12 | |
|---|---|---|---|---|---|---|---|---|---|
| Load factor | Quantity of symbols | PRS | Interval P | PRS | Interval P | PRS | Interval P | PRS | Interval P |
| 1 | 2 | 8 | 5 | 12 | 5 | 16 | 5 | 24 | 5 |
| 1.5 | 3 | | 13 | | 7 | | 5 | | 5 |
| 2 | 4 | | 7 | | 7 | | 7 | | 7 |
| 2.5 | 5 | | 5 | | 5 | | 11 | | 11 |
| 3 | 6 | | 7 | | 5 | | 5 | | 5 |
| 3.5 | 7 | | 9 | | 5 | | 29 | | 17 |
| 4 | 8 | | 9 | | 5 | | 19 | | 13 |

On the terminal side, as described in Step 303, the terminal may obtain the mapping mode described above in a plurality of manners, perform, based on the mapping mode, resource mapping on one RMB in resources allocated by the network device, generate a signal based on the mapped modulation symbol, and send the signal to the network device.

Figure 10:
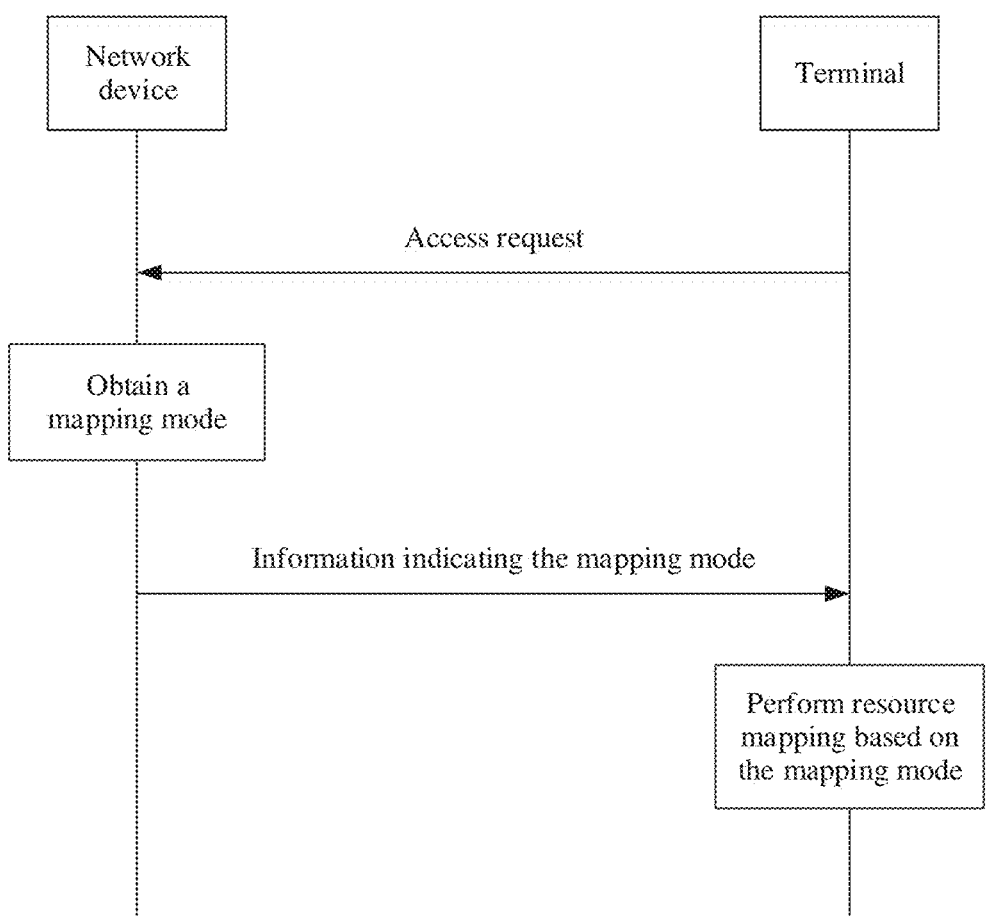
FIG. 10 is a schematic diagram of a mapping mode notification method based on signaling according to an embodiment of this application.

If the terminal obtains the mapping mode by receiving an indication of the network device, specific steps are roughly shown in FIG. 10. The terminal sends an access request to the network device when having an access requirement. When receiving the access request sent by the terminal, the network device obtains a mapping mode, and sends, to the terminal, information indicating the mapping mode. The terminal performs resource mapping based on the information indicating the mapping mode.

Specifically, the information indicating the mapping mode may include any one or a combination of the following: a mapping matrix, a quantity of REs included in an RMB, a quantity of elements included in the mapping matrix, a quantity of all mapping elements (MEs) in a mapping block (MB), an average quantity of modulation symbols carried on one RE, a group number of the terminal, all mapping locations (for example, RE sequence numbers) of the terminal in the RMB, a mapping start location (for example, an RE sequence number, a row number and a column number in the mapping matrix, or $c_{UE-n}$) of the terminal in the RMB, a quantity of modulation symbols mapped by the terminal to the RMB, a mapping ratio (MR) of the terminal, a first interval between locations, in the mapping matrix, of any two adjacent modulation symbols in a plurality of modulation symbols, a second interval between locations, in an row in the mapping matrix, of any two adjacent modulation symbols in an group of modulation symbols, a third interval between locations, in the MB, of any two adjacent modulation symbols in the plurality of modulation symbols, or a fourth interval between locations, in the MB, of any two adjacent modulation symbols in the plurality of modulation symbols. The MB is an operation unit of the mapping mode, and one modulation symbol may be mapped to one ME.

Representation forms of the mapping mode are different. The information indicating the mapping mode may be information that is related to a representation form of the mapping mode and that is in the foregoing plurality of pieces of information.

The following describes in detail a resource mapping method of the terminal.

Figure 11:
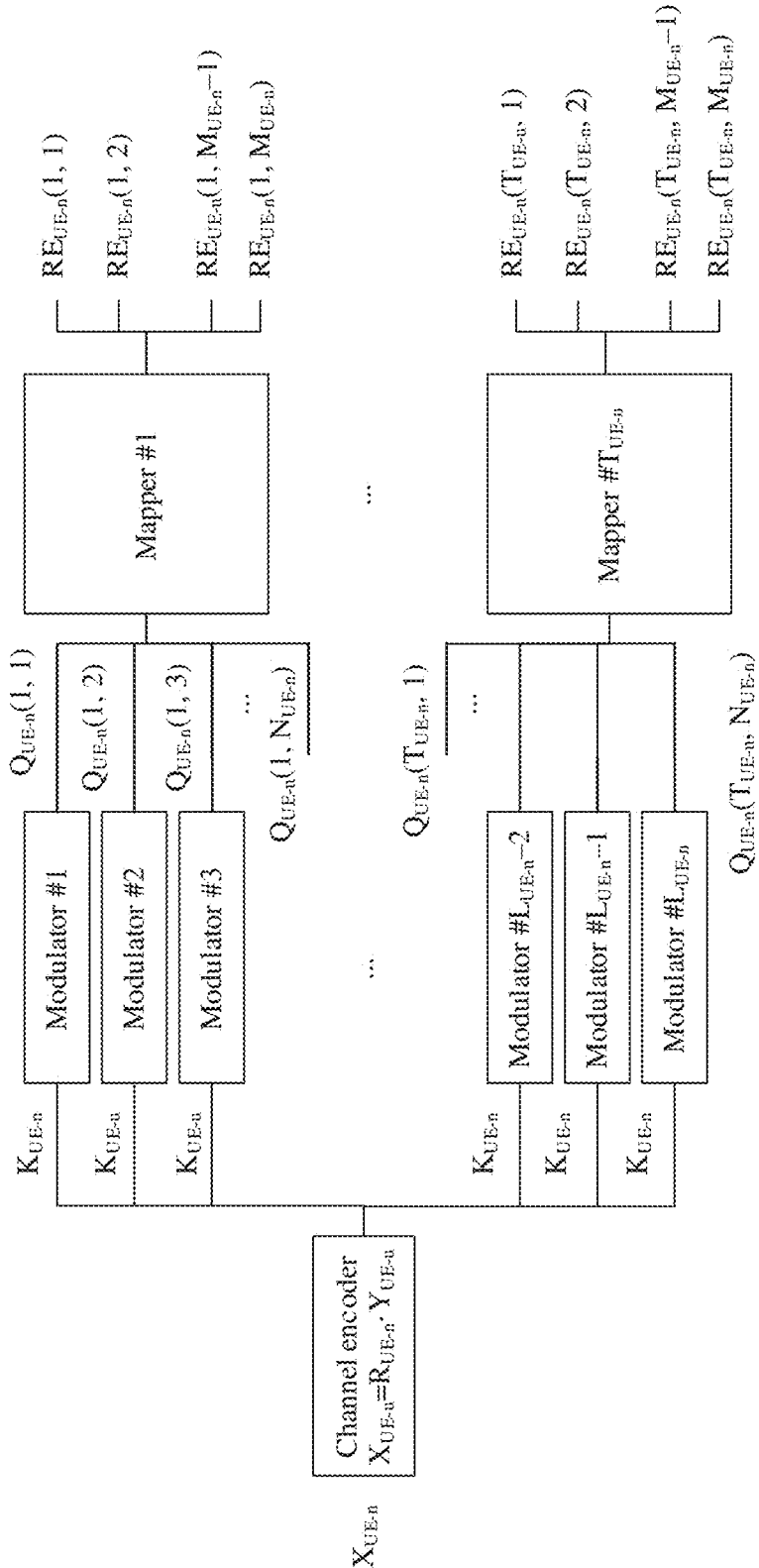
FIG. 11 is a schematic diagram of an encoding and mapping procedure at a transmit end according to an embodiment of this application.

As shown in FIG. 11, there are K terminals that are to send data. After being sorted, the K terminals are represented by UE-1, UE-2, . . . , and UE-K. A terminal UE-n indicates a terminal numbered n in the K terminals, where n is 1, 2, . . . , K. In an uplink transmission process of the terminal UE-n, a channel encoder encodes $X_{UE-n}$ information bits of the terminal UE-n into $Y_{UE-n}$ codeword bits, and then the $Y_{UE-n}$ codeword bits are modulated into $L_{UE-n}$ modulation symbols. It is assumed that the network device allocates a total of $T_{UE-n}$ RMB to the terminal UE-n, where each RMB includes $M_{UE-n}$ REs. Therefore, the terminal UE-n maps $N_{UE-n} = L_{UE-n}/T_{UE-n}$ modulation symbols to each RMB. The terminal UE-n maps the $L_{UE-n}/T_{UE-n}$ modulation symbols to each RMB by using the mapping mode provided in the present disclosure.

If the mapping mode is a mapping matrix, the terminal UE-n obtains mapping locations of the to-be-sent modulation symbols in the RMB based on the mapping matrix. Because the RMB is a repeated operation unit, mapping locations of the modulation symbols of the terminal in all RMBs are the same. For example, the to-be-sent modulation symbols of the terminal occupy REs whose sequence numbers are 1, 2, and 3 in each RMB. The mapping matrix may be correspondingly considered as an MB, and an element in the mapping matrix corresponds to an ME in the MB.

If a mapping mode of a mapping formula is used, the resource mapping method of the terminal is specifically described as follows:

The terminal UE-n obtains an equally-spaced sequence $Sequence_{p,UE-n} = [c_{UE-n}, c_{UE-n}+p, c_{UE-n}+2*p, \ldots]$, where $c_{UE-n}$ is a constant related to UE-n, and $c_{UE-n}$ may be indicated by the network device to the terminal by using signaling, or may be generated based on a user identifier (ID), for example, $c_{UE-n} = \text{mod}(UEID-1, MRS)+1$; p is the first interval described above. $N_{UE-n}$ to-be-sent modulation symbols of the terminal UE-n are spread into a sequence $$Symbol_{UE-n} = \{S_1^{UE-n}, S_2^{UE-n}, \ldots, S_{N_{UE-n}}^{UE-n}\},$$

where an $N_{UE-n}^{th}$ symbol in $Symbol_{UE-n}$ corresponds to a value of $Sequence_{p,UE-n}(N_{UE-n})$ in the equally-spaced sequence.

$Sequence_{p,UE-n}(N_{UE-n}) = c_{UE-n} + (N_{UE-n}-1) \times p$.

When N=0, 1, 2, . . . , and N is a natural number:

The terminal UE-n determines a column number Column $(N_{UE-n})$ of the $N_{UE-n}^{th}$ symbol in the mapping matrix according to a formula (5), and determines a row number Row $(N_{UE-n})$ of the $N_{UE-n}^{th}$ symbol in the mapping matrix according to a formula (6):

$$\text{Column}(N_{UE-n}) = \text{mod}\left(\left\lceil \frac{Sequence_{p,UE-n}(N_{UE-n})}{\text{CEIL}(OF)} \right\rceil, PRS\right) \quad \text{Formula (5)}$$

$$\text{Row}(N_{UE-n}) = \text{mod}(Sequence_{p,UE-n}(N_{UE-n}), \text{CEIL}(OF)) \quad \text{Formula (6)}$$

When N=1, 2, . . . , and N is an integer:

The terminal UE-n determines a column number Column $(N_{UE-n})$ of the $N_{UE-n}^{th}$ symbol in the mapping matrix according to a formula (7), and determines a row number Row ($N_{UE\text{-}n}$) of the $N_{UE\text{-}n}{}^{th}$ symbol in the mapping matrix according to a formula (8):

$$\text{Column}(N_{UE\text{-}n}) = \text{mod}\left(\left\lceil \frac{Sequence_{p,UE\text{-}n}(N_{UE\text{-}n})}{\text{CEIL}(OF)} \right\rceil - 1, PRS\right) + 1 \quad \text{Formula (7)}$$

$$\text{Row}(N_{UE\text{-}n}) = \quad \text{Formula (8)}$$
$$\text{mod}(Sequence_{p,UE\text{-}n}(N_{UE\text{-}n}) - 1, \text{CEIL}(OF)) + 1$$

mod represents a modulo operation. For explanations of other symbols, refer to the foregoing descriptions.

A mapping location of the $N_{UE\text{-}n}{}^{th}$ modulation symbol in the mapping matrix is determined based on the column number and the row number of the $N_{UE\text{-}n}{}^{th}$ modulation symbol in the mapping matrix, and an RE to which the $N_{UE\text{-}n}{}^{th}$ modulation symbol is mapped in the RMB and a mapping sequence are determined.

If a mapping mode of a circular buffer is used, a resource mapping method of the terminal is specifically described as follows:

$N_{UE\text{-}n}$ to-be-sent modulation symbols of the terminal UE-n are spread into a sequence $$Symbol_{UE\text{-}n} = \{S_1^{UE\text{-}n}, S_2^{UE\text{-}n}, \ldots, S_{N_{UE\text{-}n}}^{UE\text{-}n}\}.$$

Similarly, the terminal UE-n obtains an equally-spaced sequence $Sequence_{p,UE\text{-}n}=[c_{UE\text{-}n}, c_{UE\text{-}n}+p, c_{UE\text{-}n}+2*p, \ldots]$, where $c_{UE\text{-}n}$ is a constant related to UE-n, and $c_{UE\text{-}n}$ may be indicated by the network device to the terminal by using signaling, or may be generated based on a user identifier (ID), for example, $c_{UE\text{-}n}=\text{mod}(UEID-1, MRS)+1$; p is the first interval described above. $N_{UE\text{-}n}$ to-be-sent modulation symbols of the terminal UE-n are spread into a sequence $$Symbol_{UE\text{-}n} = \{S_1^{UE\text{-}n}, S_2^{UE\text{-}n}, \ldots, S_{N_{UE\text{-}n}}^{UE\text{-}n}\},$$

where an $N_{UE\text{-}n}{}^{th}$ symbol in $Symbol_{UE\text{-}n}$ corresponds to a value of $Sequence_{p,UE\text{-}n}(N_{UE\text{-}n})$ in the equally-spaced sequence.

$$Sequence_{p,UE\text{-}n}(N_{UE\text{-}n}) = c_{UE\text{-}n} + (N_{UE\text{-}n}-1) \times p.$$

A mapping location of the $N_{UE\text{-}n}{}^{th}$ symbol in $Symbol_{UE\text{-}n}$ in the circular buffer is $m=\text{mod}(Sequence_{p,UE\text{-}n}(N_{UE\text{-}n}), MRS)$. A mapping location of the modulation symbol in the RMB is determined based on the mapping location m of the $N_{UE\text{-}n}{}^{th}$ modulation symbol in the circular buffer. Specifically, the mapping location of the $N_{UE\text{-}n}{}^{th}$ modulation symbol in the RMB is $r=\text{floor}(m/\text{ceil}(OF))$, where a value of r may represent a sequence number of an RE in the RMB, and floor represents rounding down. A circumference of the circular buffer may be greater than or equal to a quantity of to-be-sent modulation symbols of the terminal.

When the terminal uses the mapping mode of the mapping matrix to perform resource mapping, the terminal obtains information about a first interval, and symbol mapping may implement the resource mapping method by using a mapping formula or a circular buffer.

To verify effects of the resource mapping method and the resource mapping indication method provided in the present disclosure, as shown in Table 6, the following provides some simulation results. Table 6 shows simulation results in cases of different quantities of users, spectral efficiency (SE), quantities of outer iterations (Ox) of a receiver, and quantities of inner iterations (Ix) of the receiver. A value of X is 1, 2, 3 . . . . Quantities of users are 4, 6, and 8.

TABLE 6

| Quantity of users and quantity of iterations | SNR difference required for $10^{-3}$ Spectral efficiency | | | | | | |
|---|---|---|---|---|---|---|---|
| | 0.111 | 0.204 | 0.389 | 0.574 | 0.713 | 0.944 | Total |
| 4 | | | | | | | |
| O1I3 | −0.05 | −0.03 | −0.01 | 0.01 | −0.32 | −0.31 | −0.71 |
| O2I3 | 0.02 | −0.03 | −0.02 | 0.01 | 0.01 | −0.04 | −0.05 |
| O3I3 | 0.03 | −0.02 | −0.03 | 0.08 | 0.03 | 0 | 0.09 |
| O4I3 | 0.03 | −0.02 | −0.02 | 0.06 | 0.04 | −0.03 | 0.06 |
| O5I3 | 0.03 | −0.02 | −0.02 | 0.06 | 0.03 | −0.03 | 0.05 |
| O6I3 | 0.03 | −0.02 | −0.02 | 0.06 | 0.03 | −0.04 | 0.04 |
| Sum | 0.09 | −0.14 | −0.12 | 0.28 | −0.18 | −0.45 | −0.52 |
| 6 | | | | | | | |
| O1I3 | −0.05 | −0.08 | −0.16 | −0.6 | −0.69 | −0.89 | −2.47 |
| O2I3 | 0.05 | −0.03 | 0 | 0 | −0.13 | −0.24 | −0.35 |
| O3I3 | 0.15 | 0.02 | 0.32 | 0.36 | −0.11 | −1.29 | −0.55 |
| O4I3 | 0.15 | 0.02 | 0.32 | 0.46 | −0.03 | −0.67 | 0.25 |
| O5I3 | 0.15 | 0.02 | 0.32 | 0.47 | −0.02 | −0.32 | 0.62 |
| O6I3 | 0.15 | 0.02 | 0.32 | 0.52 | −0.01 | −0.15 | 0.85 |
| Sum | 0.6 | −0.03 | 1.12 | 1.21 | −0.99 | −3.56 | −1.65 |
| 8 | | | | | | | |
| O1I3 | −0.19 | −0.24 | −2.24 | −3.32 | −3.47 | −4.3 | −13.76 |
| O2I3 | 0 | −0.01 | −0.03 | −1.53 | −3.56 | −5.03 | −10.16 |
| O3I3 | 0.17 | 0.14 | 0.48 | −0.14 | −2.37 | −5.1 | −6.82 |
| O4I3 | 0.17 | 0.15 | 0.72 | −0.05 | −1.34 | −3.7 | −4.05 |
| O5I3 | 0.17 | 0.16 | 0.74 | −0.08 | −1.19 | −2.56 | −2.76 |
| O6I3 | 0.17 | 0.16 | 0.73 | −0.11 | −1.17 | −2.47 | −2.69 |
| Sum | 0.49 | 0.36 | 0.4 | −5.23 | −13.1 | −23.16 | −40.24 |
| Total | 1.18 | 0.19 | 1.4 | −3.74 | −14.27 | −27.17 | −42.41 |

It can be learned from Table 6 that, when a system load is relatively heavy and a quantity of iterations of the receiver is relatively low, a gain is relatively obvious.

Figure 12:
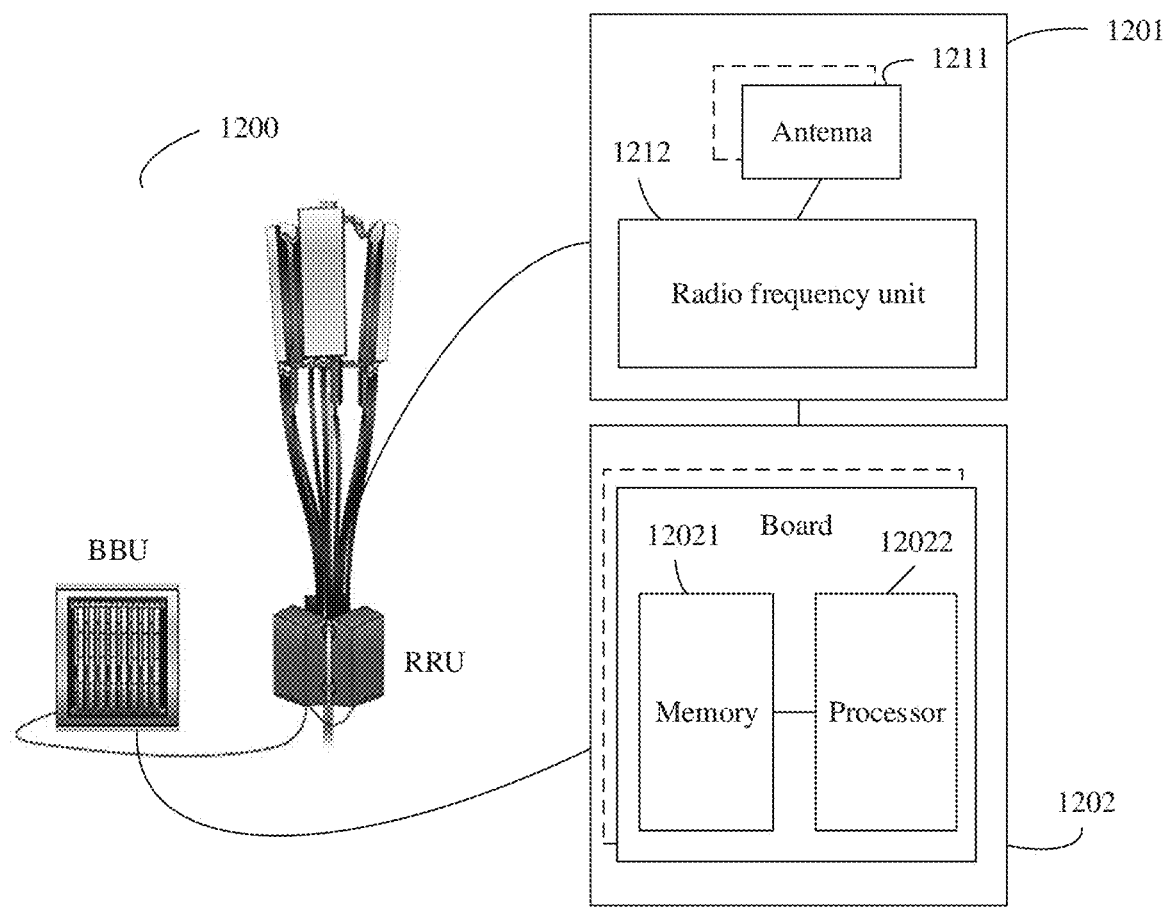
FIG. 12 is a first schematic structural diagram of a resource mapping indication apparatus according to an embodiment of this application.

As shown in FIG. 12, an embodiment of the present disclosure further provides a resource mapping indication apparatus 1200. The resource mapping indication apparatus 1200 may be a schematic structural diagram of a network device. As shown in FIG. 12, the network device may be applied to the system shown in FIG. 1, and performs a function of the network device in the foregoing method embodiments. The resource mapping indication apparatus 1200 (which may also be referred to as a network device 1200 or a base station 1200) may include one or more radio frequency units, such as a remote radio unit (RRU) 1201 and one or more baseband units (BBU) (which may also be referred to as a digital unit, DU) 1202. The RRU 1201 may be referred to as a transceiver unit, a transceiver machine, a transceiver circuit, a transceiver, or the like, and may include at least one antenna 1211 and a radio frequency unit 1212. The RRU 1201 is mainly configured to receive and send a radio frequency signal and perform conversion between the radio frequency signal and a baseband signal, for example, send information indicating a mapping mode to a terminal. The BBU 1202 is mainly configured to: perform baseband processing, control the base station, and so on. The RRU 1201 and the BBU 1202 may be physically disposed together, or may be physically disposed separately, e.g., the base station may be a distributed base station.

The BBU 1202 is a control center of the base station, may also be referred to as a processing unit, and is mainly configured to complete a baseband processing function such as channel encoding, multiplexing, modulation, or spreading. For example, the BBU (processing unit) 1202 may be configured to: control the network device to obtain a mapping mode used for resource mapping during uplink transmission, and perform an operation procedure related to the network device in the foregoing method embodiments.

In an embodiment, the BBU 1202 may include one or more boards, and a plurality of boards may jointly support a radio access network (such as an LTE network) of a single access standard, or may separately support radio access networks (such as an LTE network, a 5G network, and another network) of different access standards. The BBU 1202 further includes a memory 12021 and a processor 12022. The memory 12021 is configured to store one or more necessary instructions and necessary data. For example, the memory 12021 stores a correspondence between a codebook index and a precoding matrix in the foregoing embodiments. The processor 12022 is configured to control the network device to perform a necessary action, for example, configured to control the network device to obtain a mapping mode used for resource mapping during uplink transmission, and perform one or more operation procedures related to the network device in the foregoing method embodiments. The memory 12021 and the processor 12022 may serve one or more boards. In other words, a memory and a processor may be independently disposed on each board, or a plurality of boards may share a same memory and a same processor. In addition, a necessary circuit may further be disposed on each board.

Figure 13:
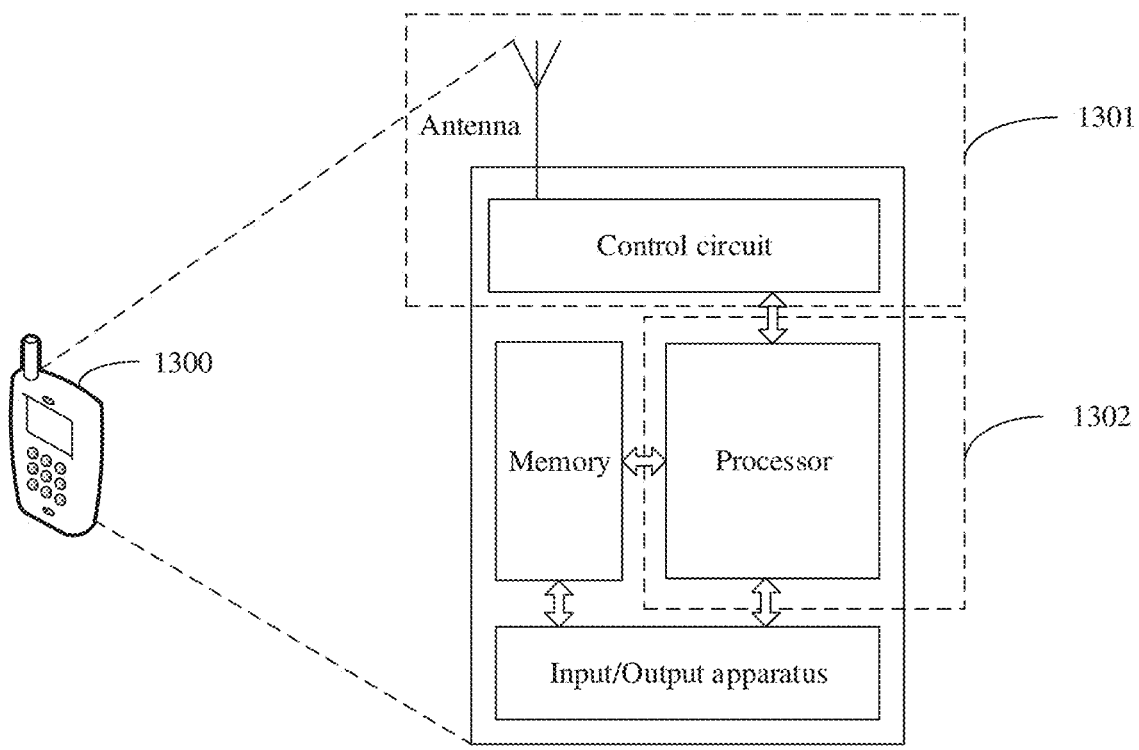
FIG. 13 is a first schematic structural diagram of a resource mapping apparatus according to an embodiment of this application.

As shown in FIG. 13, an embodiment of the present disclosure further provides a resource mapping apparatus 1300. The resource mapping indication apparatus 1300 is applicable to the communications system shown in FIG. 1, and performs one or more functions of the terminal in the foregoing method embodiments. The resource mapping apparatus 1300 may be used in a terminal, or the resource mapping apparatus 1300 is a terminal. For ease of description, FIG. 13 shows only main components of the terminal. As shown in FIG. 13, the resource mapping apparatus 1300 includes a processor, a memory, a control circuit, an antenna, and an input/output apparatus. The processor is mainly configured to: process a communication protocol and communication data, control the entire terminal, execute a software program, and process data of the software program, for example, configured to support the terminal in performing an action described in the foregoing method embodiments, for example, obtain a mapping mode used for resource mapping during uplink transmission, and determine, based on the mapping mode, mapping locations of to-be-sent modulation symbols of the terminal in a resource mapping block (RMB). The memory is mainly configured to store a software program and data, for example, store information indicating the mapping mode in the foregoing embodiment. The control circuit is mainly configured to perform conversion between a baseband signal and a radio frequency signal, and process the radio frequency signal. A combination of the control circuit and the antenna may also be referred to as a transceiver that is mainly configured to receive/send a radio frequency signal in a form of an electromagnetic wave. The input/output apparatus, for example, a touchscreen, a display, or a keyboard, is mainly configured to receive data entered by a user and output data to the user.

After the terminal is powered on, the processor may read a software program in a storage unit, explain and execute one or more instructions of the software program, and process data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside through the antenna in an electromagnetic wave form. When data is sent to the terminal, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 13 shows only one memory and only one processor. In an actual terminal, there may be a plurality of processors and a plurality of memories. The memory may also be referred to as a storage medium, a storage device, or the like. This is not limited in embodiments of the present disclosure.

In an optional implementation, the processor may include a baseband processor and/or a central processing unit. The baseband processor is mainly configured to process a communications protocol and communications data. The central processing unit is mainly configured to: control the entire terminal, execute a software program, and process data of the software program. The processor in FIG. 13 may integrate functions of the baseband processor and the central processing unit. A person skilled in the art may understand that the baseband processor and the central processing unit may alternatively be independent processors, and interconnected by using a technology, for example, a bus. A person skilled in the art may understand that the terminal may include a plurality of baseband processors to adapt to different network standards, and the terminal may include a plurality of central processing units to enhance a processing capability of the terminal. The components in the terminal may be connected by using various buses. The baseband processor may also be expressed as a baseband processing circuit or a baseband processing chip. The central processing unit may also be expressed as a central processing circuit or a central processing chip. A function of processing the communications protocol and the communication data may be built in the processor, or may be stored in the storage unit in a form of a software program. The processor executes the software program to implement a baseband processing function.

In this embodiment, the antenna that has a transceiver function and the control circuit may be considered as a transceiver unit 1301 of the resource mapping apparatus 1300. For example, the transceiver unit 1301 is configured to support the terminal in performing a receiving function and a sending function that are described in the foregoing method embodiments. The processor having a processing function is considered as a processing unit 1302 of the resource mapping apparatus 1300. As shown in FIG. 13, the resource mapping apparatus 1300 includes the transceiver unit 1301 and the processing unit 1302. The transceiver unit may also be referred to as a transceiver, a transceiver machine, a transceiver apparatus, or the like. Optionally, a component configured to implement the receiving function in the transceiver unit 1301 may be considered as a receiving unit. A component configured to implement the sending function in the transceiver unit 1301 may be considered as a sending unit. In other words, the transceiver unit 1301 includes the receiving unit and the sending unit. The receiving unit may also be referred to as a receiver, an input port, a receiver circuit, or the like. The sending unit may be referred to as a transmitter, a transmitter machine, a transmitter circuit, or the like.

The processor 1302 may be configured to execute one or more instructions stored in the memory, to control the transceiver unit 1301 to receive and/or send a signal, thereby completing the one or more functions of the terminal in the foregoing method embodiments. In an implementation, it may be considered to implement a function of the transceiver unit 1301 by using a transceiver circuit or a dedicated transceiver chip.

The present disclosure further provides a communications system, including the foregoing one or more network devices and one or more terminals.

It should be noted that the processor in the embodiments of the present disclosure may be an integrated circuit chip, and has a signal processing capability. In an implementation process, the steps in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of the present disclosure. The general-purpose processor may be a microprocessor, or the processor may be any conventional processor or the like. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing method in combination with hardware of the processor.

It may be understood that the memory in the embodiments of the present disclosure may be a volatile memory or a non-volatile memory, or may include both a volatile memory and a non-volatile memory. The non-volatile memory may be a read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. Examples but not limitative description is provided herein. Many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these types of memories and any memory of another proper type.

An embodiment of the present disclosure further provides a computer-readable medium. The computer-readable medium stores a computer program. When the computer program is executed by a computer, the methods in the foregoing method embodiments are implemented.

An embodiment of the present disclosure further provides a computer program product. When the computer program product is executed by a computer, a method in the foregoing method embodiments is implemented.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD), a semiconductor medium (for example, a solid-state drive (SSD)), or the like.

An embodiment of the present disclosure further provides a processing apparatus, including a processor and an interface. The processor is configured to perform the method in any one of the foregoing method embodiments.

It should be understood that the processing apparatus may be a chip. The processor may be implemented by hardware, or may be implemented by software. When implemented by the hardware, the processor may be a logic circuit, an integrated circuit, or the like. When implemented by the software, the processor may be a general purpose processor. The general purpose processor is implemented by reading software code stored in a memory. The memory may be integrated into the processor, may be located outside the processor, or may exist independently.

An embodiment of the present disclosure provides a computer storage medium that stores a computer program. The computer program includes one or more instructions used to perform the resource mapping indication method provided in the foregoing embodiments.

An embodiment of the present disclosure provides a computer program product including one or more instructions. When the one or more instructions are run on a computer, the computer performs the resource mapping indication method provided in the foregoing embodiment.

Figure 14:
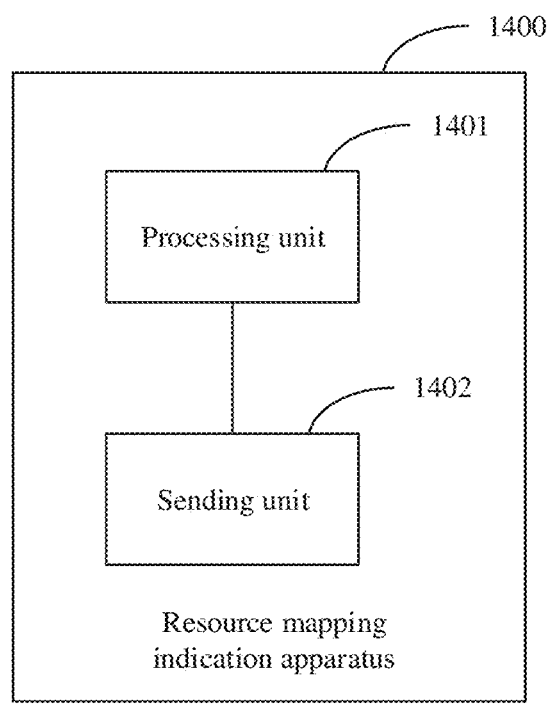
FIG. 14 is a second schematic structural diagram of a resource mapping indication apparatus according to an embodiment of this application.

As shown in FIG. 14, an embodiment of the present disclosure further provides a resource mapping indication apparatus 1400. The resource mapping indication apparatus 1400 is configured to perform one or more operations performed by the network device in the foregoing method embodiments. The resource mapping indication apparatus 1400 includes a processing unit 1401 and a sending unit 1402.

The processing unit 1401 is configured to obtain a mapping mode used for resource mapping during uplink transmission.

The sending unit 1402 is configured to send, to a terminal, information indicating the mapping mode.

For specific descriptions of the mapping mode, refer to the foregoing method embodiments, and details are not repeated herein.

When obtaining the mapping mode used for the resource mapping during the uplink transmission, the processing unit 1401 is configured to: obtain a plurality of sequentially arranged modulation symbols; determine a quantity of columns in a mapping matrix based on a quantity of resource elements (REs) included in one RMB; and determine locations of the plurality of modulation symbols in the mapping matrix.

When determining the locations of the plurality of modulation symbols in the mapping matrix, the processing unit 1401 is configured to determine locations of different groups of modulation symbols in the mapping matrix based on different second intervals.

When determining the locations of the plurality of modulation symbols in the mapping matrix, the processing unit 1401 is configured to map an $i^{th}$ group of modulation symbols in a plurality of groups of modulation symbols to an $i^{th}$ row in the mapping matrix based on a cyclic shift value, where the plurality of modulation symbols include the plurality of groups of modulation symbols.

When determining the locations of the plurality of modulation symbols in the mapping matrix, the processing unit 1401 is configured to map an $i^{th}$ group of modulation symbols in two groups of modulation symbols to an $i^{th}$ row in the mapping matrix by using an interleaver, where the plurality of modulation symbols include the plurality of groups of modulation symbols. One group of modulation symbols in the two groups of modulation symbols are interleaved in a row-in-row-out manner, and the other group of modulation symbols in the two groups of modulation symbols are interleaved in a row-in-column-out manner.

When obtaining the plurality of sequentially arranged modulation symbols, the processing unit 1401 is configured to group a plurality of users based on one or more of a mapping ratio, a power domain, a code domain, or a spatial domain. The mapping ratio is determined by a quantity of REs included in one RMB and a quantity of modulation symbols that are of one user and that can be carried on the RMB.

When obtaining the mapping mode used for the resource mapping during the uplink transmission, the processing unit 1401 is configured to: map the plurality of modulation symbols to a circular buffer at a third interval, and determine mapping locations of the plurality of modulation symbols in the RMB based on locations of the plurality of modulation symbols in the circular buffer.

It may be understood that the processing unit 1401 and the sending unit 1402 may be further configured to perform other corresponding operations performed by the network device in the foregoing method embodiments, and details are not repeated herein.

Figure 15:
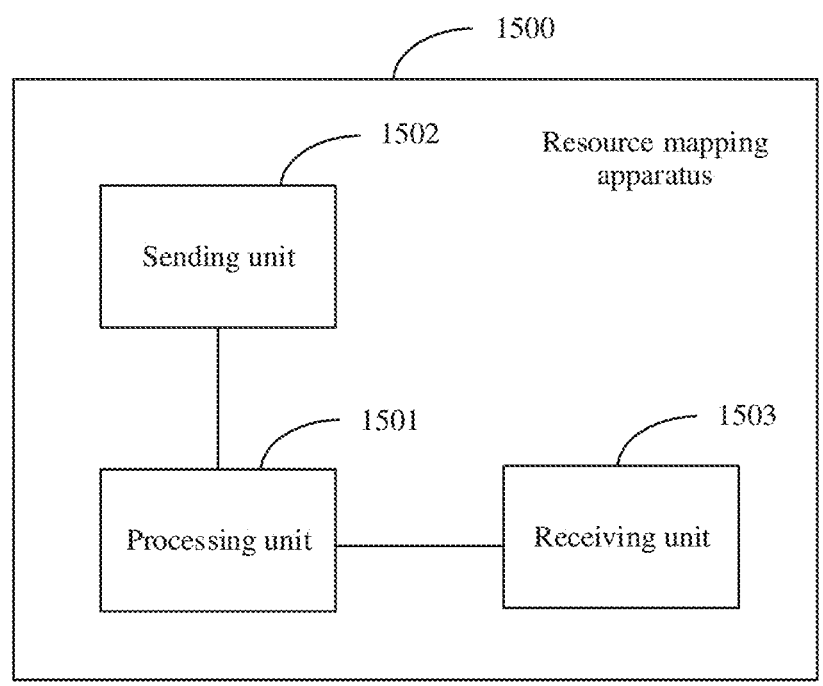
FIG. 15 is a second schematic structural diagram of a resource mapping apparatus according to an embodiment of this application.

As shown in FIG. 15, an embodiment of the present disclosure further provides a resource mapping indication apparatus 1500. The resource mapping indication apparatus 1500 is configured to perform one or more operations performed by a terminal in the foregoing method embodiments. The resource mapping indication apparatus 1500 includes a processing unit 1501, and may further include a sending unit 1502 and a receiving unit 1503.

The processing unit 1501 is configured to obtain a mapping mode used for resource mapping during uplink transmission.

The processing unit 1501 is further configured to determine, based on the mapping mode, mapping locations of to-be-sent modulation symbols of the terminal in a resource mapping block (RMB).

For specific descriptions of the mapping mode, refer to the foregoing method embodiments, and details are not repeated herein.

When determining, based on the mapping mode, the mapping locations of the to-be-sent modulation symbols in the resource mapping block (RMB), the processing unit 1501 is configured to: map the to-be-sent modulation symbols into a circular buffer at a fixed interval; and determine the mapping locations of the to-be-sent modulation symbols in the RMB based on locations of the to-be-sent modulation symbols in the circular buffer.

The receiving unit 1503 is configured to receive, from a network device, information indicating the mapping mode.

The sending unit 1502 is configured to send the modulation symbol to the network device.

When obtaining the mapping mode used for the resource mapping during the uplink transmission, the processing unit 1501 is configured to: determine, based on a user identifier UE-ID, the information used to indicate the mapping mode; determine, according to a standard protocol, the information used to indicate the mapping mode; or obtain the pre-stored information used to indicate the mapping mode.

It may be understood that the processing unit 1501, the sending unit 1502, and the receiving unit 1503 may be further configured to perform other corresponding operations performed by the terminal in the foregoing method embodiments, and details are not repeated herein.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. In addition, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided to a processor of a general-purpose computer, a dedicated computer, an embedded processor, or another programmable data processing device to generate a machine, so that the instructions executed by a processor of a computer or another programmable data processing device generate an apparatus configured to implement a specified function in one or more processes in the flowcharts and/or in one or more blocks in the block diagrams.

These computer program instructions may be stored in a computer-readable memory that can indicate the computer or another data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may be loaded to a computer or another programmable data processing device, so that a series of operations and steps are performed on the computer or the another programmable device, thereby generating computer-implemented processing. Therefore, the instructions executed on the computer or the other programmable device provide steps for implementing a specified function in one or more processes in the flowcharts and/or in one or more blocks in the block diagrams.

What is claimed is:

1. A method, comprising:
obtaining, by a terminal, information indicating a mapping mode used for resource mapping during uplink transmission, wherein the mapping mode indicates mapping locations of a plurality of modulation symbols of a plurality of terminals in a resource mapping block (RMB), the plurality of modulation symbols comprises to-be-sent modulation symbols of the terminal, the RMB comprises a plurality of resource elements (REs), and at least one of the plurality of REs carries at least two of the plurality of modulation symbols of the plurality of terminals; and
determining, by the terminal based on the mapping mode, mapping locations of the to-be-sent modulation symbols of the terminal in the RMB,
wherein the mapping mode comprises a mapping matrix, and columns in the mapping matrix are in a one-to-one correspondence with the plurality of REs comprised in the RMB, a quantity of the columns in the mapping matrix corresponds to a quantity of the plurality of REs comprised in the RMB, and a quantity of rows in the mapping matrix indicates a maximum quantity of modulation symbols carried on any one of the plurality of REs.

2. The method according to claim 1, wherein the mapping matrix is a basic mapping matrix, and the basic mapping matrix comprises:

$$\begin{bmatrix} 1 & 1 & 2 & 2 & 3 & 3 & 4 & 4 & 5 & 5 & 6 & 6 \\ 7 & 9 & 11 & 8 & 12 & 7 & 10 & 11 & 9 & 12 & 8 & 10 \end{bmatrix};$$

$$\begin{bmatrix} 1 & 1 & 1 & 2 & 2 & 2 & 3 & 3 & 3 & 4 & 4 & 4 \\ 5 & 6 & 7 & 6 & 7 & 8 & 8 & 5 & 6 & 7 & 8 & 5 \end{bmatrix};$$

$$\begin{bmatrix} 1 & 1 & 1 & 1 & 2 & 2 & 2 & 2 & 3 & 3 & 3 & 3 \\ 4 & 5 & 6 & 4 & 6 & 4 & 5 & 6 & 5 & 6 & 4 & 5 \end{bmatrix};$$

$$\begin{bmatrix} 1 & 1 & 1 & 1 & 2 & 2 & 2 & 2 & 3 & 3 & 3 & 3 \\ 4 & 5 & 6 & 4 & 4 & 5 & 6 & 5 & 4 & 5 & 6 & 6 \\ 7 & 8 & 9 & 7 & 8 & 7 & 8 & 9 & 9 & 7 & 8 \end{bmatrix}; \text{or}$$

$$\begin{bmatrix} 1 & 1 & 1 & 1 & 1 & 1 & 2 & 2 & 2 & 2 & 2 & 2 \\ 3 & 3 & 3 & 4 & 4 & 4 & 3 & 3 & 3 & 4 & 4 & 4 \\ 5 & 5 & 6 & 6 & 5 & 5 & 6 & 6 & 5 & 5 & 6 & 6 \\ 7 & 8 & 7 & 8 & 7 & 8 & 7 & 8 & 7 & 8 & 7 & 8 \end{bmatrix}.$$

3. The method according to claim 1, wherein the mapping matrix is a transformed mapping matrix, and the transformed mapping matrix is obtained after a basic mapping matrix is transformed by using any one or a combination of the following:
upon determining that a quantity of scheduled terminals is less than a quantity of terminals carried in the basic mapping matrix, setting mapping locations of some terminals in the basic mapping matrix to null;
upon determining that a quantity of modulation symbols actually mapped by a terminal is less than a quantity of modulation symbols that are of one user and that are carried in the basic mapping matrix, setting mapping locations of some modulation symbols in the basic mapping matrix to null;
upon determining that a quantity of modulation symbols actually mapped by a terminal is greater than a quantity of modulation symbols that are of one user and that are carried in the basic mapping matrix, placing modulation symbols of one terminal in mapping locations occupied by a plurality of terminals in the basic mapping matrix; or
combining some mapping locations in any quantity of basic mapping matrices.

4. The method according to claim 3, wherein the determining, by the terminal based on the mapping mode, mapping locations of the to-be-sent modulation symbols in the resource mapping block (RMB) comprises:
mapping, by the terminal, the to-be-sent modulation symbols into a circular buffer at a fixed interval; and
determining, by the terminal, mapping locations of the to-be-sent modulation symbols in the RMB based on locations of the to-be-sent modulation symbols in the circular buffer.

5. The method according to claim 4, wherein a location m, in the circular buffer, of an $N_{UE-n}^{th}$ modulation symbol in the to-be-sent modulation symbols is mod(Sequence$_{p,UE-n}$ ($N_{UE-n}$), MRS), and a mapping location r of the $N_{UE-n}^{th}$ modulation symbol in the RMB is floor(m/CEIL(OF)), wherein UE-n represents an $n^{th}$ terminal in the plurality of terminals, n is an integer, $N_{UE-n}$ represents a quantity of modulation symbols mapped by the $n^{th}$ terminal to one RMB, the $N_{UE-n}^{th}$ modulation symbol represents a modulation symbol mapped by the $n^{th}$ terminal to one RMB, mod represents a modulo operation, floor represents rounding down, OF represents an average quantity of modulation symbols carried on one of the plurality of REs, CEIL(OF) represents rounding up OF, the sequence Sequence$_{p,UE-n}$=[$c_{UE-n}$, $c_{UE-n}$+p, $c_{UE-n}$+2*p, ..., $c_{UE-n}$+L*p], L is a quantity of to-be-sent modulation symbols, $c_{UE-n}$ is a constant, MRS is a quantity of all mapping elements (MEs) in a mapping block (MB), the MB is an operation unit of the mapping mode, one modulation symbol may be mapped to one ME, PRS represents a maximum quantity of modulation symbols carried on the RMB, p is the fixed interval, Sequence$_{p,UE-n}$($N_{UE-n}$) is a value, in the sequence, corresponding to the $N_{UE-n}^{th}$ modulation symbol in the to-be-sent modulation symbols, Sequence$_{p,UE-n}$($N_{UE-n}$)=$c_{UE-n}$+($N_{UE-n}$−1)×p, N is an integer, and N=1, 2, ....

6. The method according to claim 5, wherein the information indicating the mapping mode comprises any one or a combination of the following:
the mapping matrix, the quantity of REs comprised in the RMB, a quantity of elements comprised in the mapping matrix, a quantity of all the mapping elements (MEs) in the mapping block (MB), an average maximum quantity of modulation symbols carried on one of the plurality of REs, a group number of the terminal, all mapping locations of the terminal in the RMB, a mapping start location of the terminal in the RMB, a quantity of modulation symbols mapped by the terminal to the RMB, an average quantity of modulation symbols mapped by the terminal to each of the plurality of REs, a first interval between the locations, in the mapping matrix, of any two adjacent modulation symbols in the plurality of modulation symbols, a second interval between the locations, in the $i^{th}$ row in the mapping matrix, of any two adjacent modulation symbols in the $i^{th}$ group of modulation symbols, a third interval between locations, in the MB, of any two adjacent modulation symbols in the plurality of modulation symbols, or a fourth interval between locations, in the MB, of any two adjacent modulation symbols in the plurality of modulation symbols; and wherein the MB is an operation unit of the mapping mode, and one modulation symbol may be mapped to one ME.

7. The method according to claim 4, wherein:
when $N_{UE-n}=0, 1, 2, \ldots$, a mapping location, in the RMB, of an $N_{UE-n}^{th}$ modulation symbol in the to-be-sent modulation symbols is $$\mathrm{mod}\left(\left\lceil\frac{Sequence_{p,UE-n}(N_{UE-n})}{\mathrm{CEIL}(OF)}\right\rceil, PRS\right);$$

or when $N_{UE-n}=1, 2, \ldots$, a mapping location, in the RMB, of an $N_{UE-n}^{th}$ modulation symbol in the to-be-sent modulation symbols is $$\mathrm{mod}\left(\left\lceil\frac{Sequence_{p,UE-n}(N_{UE-n})}{\mathrm{CEIL}(OF)}\right\rceil-1, PRS\right)+1,$$

wherein
mod represents a modulo operation, PRS represents a maximum quantity of modulation symbols carried on the RMB, the sequence $Sequence_{p,UE-n}=[c_{UE-n}, c_{UE-n}+p, c_{UE-n}+2*p, \ldots, c_{UE-n}+L*p]$, L is a quantity of to-be-sent modulation symbols, $c_{UE-n}$ is a constant, p is a fixed interval, $Sequence_{p,UE-n}(N_{UE-n})$ is a value, in the sequence, corresponding to the $N_{UE-n}^{th}$ modulation symbol in the to-be-sent modulation symbols, and $Sequence_{p,UE-n}(N_{UE-n})=c_{UE-n}+(N_{UE-n}-1)\times p$.

8. The method according to claim 4, wherein the fixed interval and the quantity of modulation symbols carried on one of the plurality of REs are relatively prime, and the interval and a quantity of the plurality of REs comprised in the RMB are relatively prime.

9. An apparatus, comprising:
at least one processor coupled to one or more memories storing programming instructions that, when executed by the at least one processor, cause the at least one processor to:
obtain information indicating a mapping mode used for resource mapping during uplink transmission, wherein the mapping mode is indicative of mapping locations of a plurality of modulation symbols of a plurality of terminals in a resource mapping block (RMB), the plurality of modulation symbols comprises to-be-sent modulation symbols of a terminal, the RMB comprises a plurality of resource elements (REs), and at least one of the plurality of REs carries at least two of the plurality of modulation symbols of the plurality of terminals; and
determine mapping locations of the to-be-sent modulation symbols of the terminal in the RMB,
wherein the mapping mode comprises a mapping matrix, and columns in the mapping matrix are in a one-to-one correspondence with the plurality of REs comprised in the RMB, a quantity of the columns in the mapping matrix corresponds to a quantity of the plurality of resource elements (REs) comprised in the RMB, and a quantity of rows in the mapping matrix indicates a maximum quantity of modulation symbols carried on any one of the plurality of REs.

10. The apparatus according to claim 9, wherein the mapping matrix is a basic mapping matrix, and the basic mapping matrix comprises:

$$\begin{bmatrix} 1 & 1 & 2 & 2 & 3 & 3 & 4 & 4 & 5 & 5 & 6 & 6 \\ 7 & 9 & 11 & 8 & 12 & 7 & 10 & 11 & 9 & 12 & 8 & 10 \end{bmatrix};$$

$$\begin{bmatrix} 1 & 1 & 1 & 2 & 2 & 2 & 3 & 3 & 3 & 4 & 4 & 4 \\ 5 & 6 & 7 & 6 & 7 & 8 & 8 & 5 & 6 & 7 & 8 & 5 \end{bmatrix};$$

$$\begin{bmatrix} 1 & 1 & 1 & 1 & 2 & 2 & 2 & 2 & 3 & 3 & 3 & 3 \\ 4 & 5 & 6 & 4 & 6 & 4 & 5 & 6 & 5 & 6 & 4 & 5 \end{bmatrix};$$

$$\begin{bmatrix} 1 & 1 & 1 & 1 & 2 & 2 & 2 & 2 & 3 & 3 & 3 & 3 \\ 4 & 5 & 6 & 4 & 4 & 5 & 6 & 5 & 4 & 5 & 6 & 6 \\ 7 & 8 & 9 & 7 & 8 & 7 & 8 & 9 & 9 & 9 & 7 & 8 \end{bmatrix}; \text{ or}$$

$$\begin{bmatrix} 1 & 1 & 1 & 1 & 1 & 1 & 2 & 2 & 2 & 2 & 2 & 2 \\ 3 & 3 & 3 & 4 & 4 & 4 & 3 & 3 & 3 & 4 & 4 & 4 \\ 5 & 5 & 6 & 6 & 5 & 5 & 6 & 6 & 5 & 5 & 6 & 6 \\ 7 & 8 & 7 & 8 & 7 & 8 & 7 & 8 & 7 & 8 & 7 & 8 \end{bmatrix}.$$

11. The apparatus according to claim 9, wherein the mapping matrix is a transformed mapping matrix, and the transformed mapping matrix is obtained after a basic mapping matrix is transformed by using any one or a combination of the following:
upon determining that a quantity of scheduled terminals is less than a quantity of terminals carried in the basic mapping matrix, setting mapping locations of some terminals in the basic mapping matrix to null;
upon determining that a quantity of modulation symbols actually mapped by a terminal is less than a quantity of modulation symbols that are of one user and that are carried in the basic mapping matrix, setting mapping locations of some modulation symbols in the basic mapping matrix to null;
upon determining that a quantity of modulation symbols actually mapped by a terminal is greater than a quantity of modulation symbols that are of one user and that are carried in the basic mapping matrix, placing modulation symbols of one terminal in mapping locations occupied by a plurality of terminals in the basic mapping matrix; or
combining some mapping locations in any quantity of basic mapping matrices.

12. The apparatus according to claim 11, wherein the determining, based on the mapping mode, mapping locations of the to-be-sent modulation symbols in the RMB comprises:
Mapping the to-be-sent modulation symbols into a circular buffer at a fixed interval; and
determining, locations of the to-be-sent modulation symbols in the RMB based on locations of the to-be-sent modulation symbols in the circular buffer.

13. The apparatus according to claim 12 wherein a location m, in the circular buffer, of an $N_{UE-n}{}^{th}$ modulation symbol in the to-be-sent modulation symbols is mod(Sequence$_{p,UE-n}$($N_{UE-n}$), MRS), and a mapping location r of the $N_{UE-n}{}^{th}$ modulation symbol in the RMB is floor(m/CEIL(OF)), wherein
- UE-n represents an $n^{th}$ terminal in the plurality of terminals, n is an integer, $N_{UE-n}$ represents a quantity of modulation symbols mapped by the $n^{th}$ terminal to one RMB, the $N_{UE-n}{}^{th}$ modulation symbol represents a modulation symbol mapped by the $n^{th}$ terminal to one RMB, mod represents a modulo operation, OF represents an average quantity of modulation symbols carried on one of the plurality of REs, CEIL(OF) represents rounding up OF, floor represents rounding down, the sequence Sequence$_{p,UE-n}$=[$c_{UE-n}$, $c_{UE-n}$+p, $c_{UE-n}$+2*p, . . . , $c_{UE-n}$+L*p], L is a quantity of to-be-sent modulation symbols, $c_{UE-n}$ is a constant, MRS is a quantity of all mapping elements (MEs) in a mapping block (MB), the MB is an operation unit of the mapping mode, one modulation symbol may be mapped to one ME, PRS represents a maximum quantity of modulation symbols carried on the RMB, p is the fixed interval, Sequence$_{p,UE-n}$($N_{UE-n}$) is a value, in the sequence, corresponding to the $N_{UE-n}{}^{th}$ symbol in the to-be-sent modulation symbols, Sequence$_{p,UE-n}$($N_{UE-n}$)=$c_{UE-n}$+($N_{UE-n}$−1)×p, N is an integer, and N=1, 2, . . . .

14. The apparatus according to claim 12, wherein the information indicating the mapping mode comprises any one or a combination of the following:
- the mapping matrix, the quantity of REs comprised in the RMB, a quantity of elements comprised in the mapping matrix, a quantity of all the mapping elements (MEs) in the mapping block (MB), an average maximum quantity of modulation symbols carried on one of the plurality of REs, a group number of the terminal, all mapping locations of the terminal in the RMB, a mapping start location of the terminal in the RMB, a quantity of modulation symbols mapped by the terminal to the RMB, an average quantity of modulation symbols mapped by the terminal to each of the plurality of REs, a first interval between the locations, in the mapping matrix, of any two adjacent modulation symbols in the plurality of modulation symbols, a second interval between the locations, in the $i^{th}$ row in the mapping matrix, of any two adjacent modulation symbols in the $i^{th}$ group of modulation symbols, a third interval between locations, in the MB, of any two adjacent modulation symbols in the plurality of modulation symbols, or a fourth interval between locations, in the MB, of any two adjacent modulation symbols in the plurality of modulation symbols; and
- wherein the MB is an operation unit of the mapping mode, and one modulation symbol may be mapped to one ME.

15. The apparatus according to claim 12, wherein:
when $N_{UE-n}$=0, 1, 2, . . . , a mapping location, in the RMB, of an $N_{UE-n}{}^{th}$ modulation symbol in the to-be-sent modulation symbols is $$\mathrm{mod}\left(\left\lceil \frac{Sequence_{p,UE-n}(N_{UE-n})}{\mathrm{CEIL}(OF)} \right\rceil, PRS\right);$$

or when $N_{UE-n}$=1, 2, . . . , a mapping location, in the RMB, of an $N_{UE-n}{}^{th}$ modulation symbol in the to-be-sent modulation symbols is $$\mathrm{mod}\left(\left\lceil \frac{Sequence_{p,UE-n}(N_{UE-n})}{\mathrm{CEIL}(OF)} \right\rceil - 1, PRS\right)+1,$$

wherein
- mod represents a modulo operation, PRS represents a maximum quantity of modulation symbols carried on the RMB, the sequence Sequence$_{p,UE-n}$=[$c_{UE-n}$, $c_{UE-n}$+p, $c_{UE-n}$+2*p, . . . , $c_{UE-n}$+L*p], L is a quantity of to-be-sent modulation symbols, $c_{UE-n}$ is a constant, p is a fixed interval, Sequence$_{p,UE-n}$($N_{UE-n}$) is a value, in the sequence, corresponding to the $N_{UE-n}{}^{th}$ modulation symbol in the to-be-sent modulation symbols, and Sequence$_{p,UE-n}$($N_{UE-n}$)=$c_{UE-n}$+($N_{UE-n}$−1)×p.

16. The apparatus according to claim 12, wherein the fixed interval and the quantity of modulation symbols carried on one of the plurality of REs are relatively prime, and the interval and a quantity of the plurality of REs comprised in the RMB are relatively prime.

17. A method, comprising:
- obtaining, by a network device, a mapping mode used for resource mapping during uplink transmission; and
- sending, by the network device to a terminal, information indicating the mapping mode, wherein
- the mapping mode is indicative of mapping locations of a plurality of modulation symbols of a plurality of terminals in a resource mapping block (RMB), the plurality of modulation symbols comprise to-be-sent modulation symbols of the terminal, the RMB comprises a plurality of resource elements (REs), and at least one of the plurality of REs carries at least two of the plurality of modulation symbols of the plurality of terminals; and
- wherein the mapping mode comprises a mapping matrix, and columns in the mapping matrix are in a one-to-one correspondence with the plurality of REs comprised in the RMB, a quantity of the columns in the mapping matrix corresponds to a quantity of the plurality of resource elements (REs) comprised in the RMB, and a quantity of rows in the mapping matrix indicates a maximum quantity of modulation symbols carried on any one of the plurality of REs.

18. The method according to claim 17, wherein the mapping matrix is a basic mapping matrix, and the basic mapping matrix comprises:

$$\begin{bmatrix} 1 & 1 & 2 & 2 & 3 & 3 & 4 & 4 & 5 & 5 & 6 & 6 \\ 7 & 9 & 11 & 8 & 12 & 7 & 10 & 11 & 9 & 12 & 8 & 10 \end{bmatrix};$$

$$\begin{bmatrix} 1 & 1 & 1 & 2 & 2 & 2 & 3 & 3 & 3 & 4 & 4 & 4 \\ 5 & 6 & 7 & 6 & 7 & 8 & 8 & 5 & 6 & 7 & 8 & 5 \end{bmatrix};$$

$$\begin{bmatrix} 1 & 1 & 1 & 1 & 2 & 2 & 2 & 2 & 3 & 3 & 3 & 3 \\ 4 & 5 & 6 & 4 & 6 & 4 & 5 & 6 & 5 & 6 & 4 & 5 \end{bmatrix};$$

$$\begin{bmatrix} 1 & 1 & 1 & 1 & 2 & 2 & 2 & 2 & 3 & 3 & 3 & 3 \\ 4 & 5 & 6 & 4 & 4 & 5 & 6 & 5 & 4 & 5 & 6 & 6 \\ 7 & 8 & 9 & 7 & 8 & 7 & 8 & 9 & 9 & 9 & 7 & 8 \end{bmatrix}; \text{ or}$$

$$\begin{bmatrix} 1 & 1 & 1 & 1 & 1 & 1 & 2 & 2 & 2 & 2 & 2 & 2 \\ 3 & 3 & 3 & 4 & 4 & 4 & 3 & 3 & 3 & 4 & 4 & 4 \\ 5 & 5 & 6 & 6 & 5 & 5 & 6 & 6 & 5 & 5 & 6 & 6 \\ 7 & 8 & 7 & 8 & 7 & 8 & 7 & 8 & 7 & 8 & 7 & 8 \end{bmatrix}.$$

19. The method according to claim 17, wherein the mapping matrix is a transformed mapping matrix, and the transformed mapping matrix is obtained after a basic mapping matrix is transformed by using any one or a combination of the following:

upon determining that a quantity of scheduled terminals is less than a quantity of terminals carried in the basic mapping matrix, setting mapping locations of some terminals in the basic mapping matrix to null;

upon determining that a quantity of modulation symbols actually mapped by a terminal is less than a quantity of modulation symbols that are of one user and that are carried in the basic mapping matrix, setting mapping locations of some modulation symbols in the basic mapping matrix to null;

upon determining that a quantity of modulation symbols actually mapped by a terminal is greater than a quantity of modulation symbols that are of one user and that are carried in the basic mapping matrix, placing modulation symbols of one terminal in mapping locations occupied by a plurality of terminals in the basic mapping matrix; or combining some mapping locations in any quantity of basic mapping matrices.

20. The method according to claim 17, wherein the obtaining a mapping mode used for resource mapping during uplink transmission comprises:

mapping, by the network device, the plurality of modulation symbols into a circular buffer at an interval; and determining, by the network device, the mapping locations of the plurality of modulation symbols in the RMB based on locations of the plurality of modulation symbols in the circular buffer.

* * * * *